(12) United States Patent
Mehlman et al.

(10) Patent No.: US 9,077,421 B1
(45) Date of Patent: Jul. 7, 2015

(54) SYSTEMS AND METHODS FOR HYBRID SELF-INTERFERENCE CANCELLATION

(71) Applicant: Kumu Networks, Inc., Santa Clara, CA (US)

(72) Inventors: Jeffrey Mehlman, Santa Clara, CA (US); Mayank Jain, Santa Clara, CA (US); Jung-Il Choi, Santa Clara, CA (US); Dinesh Bharadia, Santa Clara, CA (US)

(73) Assignee: Kumu Networks, Inc., Santa Clara, CA (US)

(*) Notice: Subject to any disclaimer, the term of this patent is extended or adjusted under 35 U.S.C. 154(b) by 0 days.

(21) Appl. No.: 14/569,354

(22) Filed: Dec. 12, 2014

Related U.S. Application Data

(60) Provisional application No. 61/915,431, filed on Dec. 12, 2013.

(51) Int. Cl.
| | |
|---|---|
| *H04B 1/12* | (2006.01) |
| *H04B 1/10* | (2006.01) |
| *H04L 5/14* | (2006.01) |
| *H04B 1/04* | (2006.01) |

(52) U.S. Cl.
CPC .. *H04B 1/10* (2013.01); *H04L 5/14* (2013.01); *H04B 1/0475* (2013.01)

(58) Field of Classification Search
CPC .................................... H04B 1/12; H04L 5/14
USPC ........................................................ 375/346
See application file for complete search history.

(56) References Cited

U.S. PATENT DOCUMENTS

| | | | |
|---|---|---|---|
| 4,952,193 | A | 8/1990 | Talwar |
| 5,691,978 | A * | 11/1997 | Kenworthy .................. 370/278 |
| 6,215,812 | B1 | 4/2001 | Young et al. |
| 6,567,649 | B2 | 5/2003 | Souissi |
| 6,639,551 | B2 | 10/2003 | Li et al. |
| 6,725,017 | B2 * | 4/2004 | Blount et al. .............. 455/67.13 |
| 6,965,657 | B1 | 11/2005 | Rezvani et al. |
| 7,336,940 | B2 | 2/2008 | Smithson |
| 7,362,257 | B2 | 4/2008 | Bruzzone et al. |
| 7,426,242 | B2 | 9/2008 | Thesling |
| 7,869,527 | B2 * | 1/2011 | Vetter et al. .................. 375/259 |
| 8,155,595 | B2 | 4/2012 | Sahin et al. |
| 8,175,535 | B2 | 5/2012 | Mu |
| 8,179,990 | B2 | 5/2012 | Orlik et al. |
| 8,218,697 | B2 | 7/2012 | Guess et al. |
| 8,351,533 | B2 | 1/2013 | Shrivastava et al. |
| 2003/0031279 | A1 * | 2/2003 | Blount et al. ................. 375/346 |

(Continued)

FOREIGN PATENT DOCUMENTS

| | | |
|---|---|---|
| EP | 0755141 B1 | 10/2005 |
| EP | 2267946 A2 | 12/2010 |

(Continued)

*Primary Examiner* — Shuwang Liu
*Assistant Examiner* — Helene Tayong
(74) *Attorney, Agent, or Firm* — Jeffrey Schox; Thomas Gwinn

(57) ABSTRACT

A system for hybrid self-interference cancellation includes a transmit coupler that samples an RF transmit signal, a RF self-interference canceller that transforms the sampled RF transmit signal to an RF self-interference cancellation signal, an IF self-interference canceller that transforms a downconverted version of the RF transmit signal to an ISRF self-interference cancellation signal, and a receive coupler that combines the RF and ISRF self-interference cancellation signals with an RF receive signal.

18 Claims, 23 Drawing Sheets

(56) References Cited

U.S. PATENT DOCUMENTS

| | | |
|---|---|---|
| 2003/0099287 A1 | 5/2003 | Arambepola |
| 2004/0106381 A1 | 6/2004 | Tiller |
| 2005/0078743 A1* | 4/2005 | Shohara .................. 375/219 |
| 2005/0159128 A1 | 7/2005 | Collins et al. |
| 2005/0190870 A1 | 9/2005 | Blount et al. |
| 2005/0254555 A1 | 11/2005 | Teague |
| 2007/0018722 A1 | 1/2007 | Jaenecke |
| 2007/0274372 A1 | 11/2007 | Asai et al. |
| 2008/0107046 A1 | 5/2008 | Kangasmaa et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0180404 A1 | 7/2009 | Jung et al. |
| 2009/0186582 A1 | 7/2009 | Muhammad et al. |
| 2010/0022201 A1 | 1/2010 | Vandenameele |
| 2010/0117693 A1 | 5/2010 | Lorg et al. |
| 2010/0150033 A1 | 6/2010 | Zinser et al. |
| 2010/0159858 A1 | 6/2010 | Dent et al. |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0149714 A1 | 6/2011 | Rimini et al. |
| 2011/0216813 A1 | 9/2011 | Baldemair et al. |
| 2011/0222631 A1 | 9/2011 | Jong |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1* | 8/2012 | Jain et al. .................. 370/277 |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0155913 A1 | 6/2013 | Sarca |
| 2013/0166259 A1 | 6/2013 | Weber et al. |
| 2013/0301487 A1 | 11/2013 | Khandani |
| 2013/0301488 A1 | 11/2013 | Hong et al. |
| 2014/0169236 A1 | 6/2014 | Choi et al. |
| 2014/0219139 A1 | 8/2014 | Choi et al. |

FOREIGN PATENT DOCUMENTS

| | | |
|---|---|---|
| WO | 2013185106 A1 | 12/2013 |
| WO | 2014093916 A1 | 6/2014 |

* cited by examiner

SYSTEMS AND METHODS FOR HYBRID SELF-INTERFERENCE CANCELLATION

CROSS-REFERENCE TO RELATED APPLICATIONS

This application claims the benefit of U.S. Provisional Application Ser. No. 61/915,431, filed on 12 Dec. 2013, which is incorporated in its entirety by this reference.

TECHNICAL FIELD

This invention relates generally to the wireless communications field, and more specifically to new and useful systems and methods for hybrid self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, especially in environments where self-interference is significantly frequency dependent across the band of transceiver operation or where digital self-interference cancellation is hampered by receiver dynamic range issues. Thus, there is a need in the wireless communications field to create new and useful systems and methods for hybrid self-interference cancellation. This invention provides such new and useful systems and methods.

DESCRIPTION OF THE PREFERRED EMBODIMENTS

Figure 1:
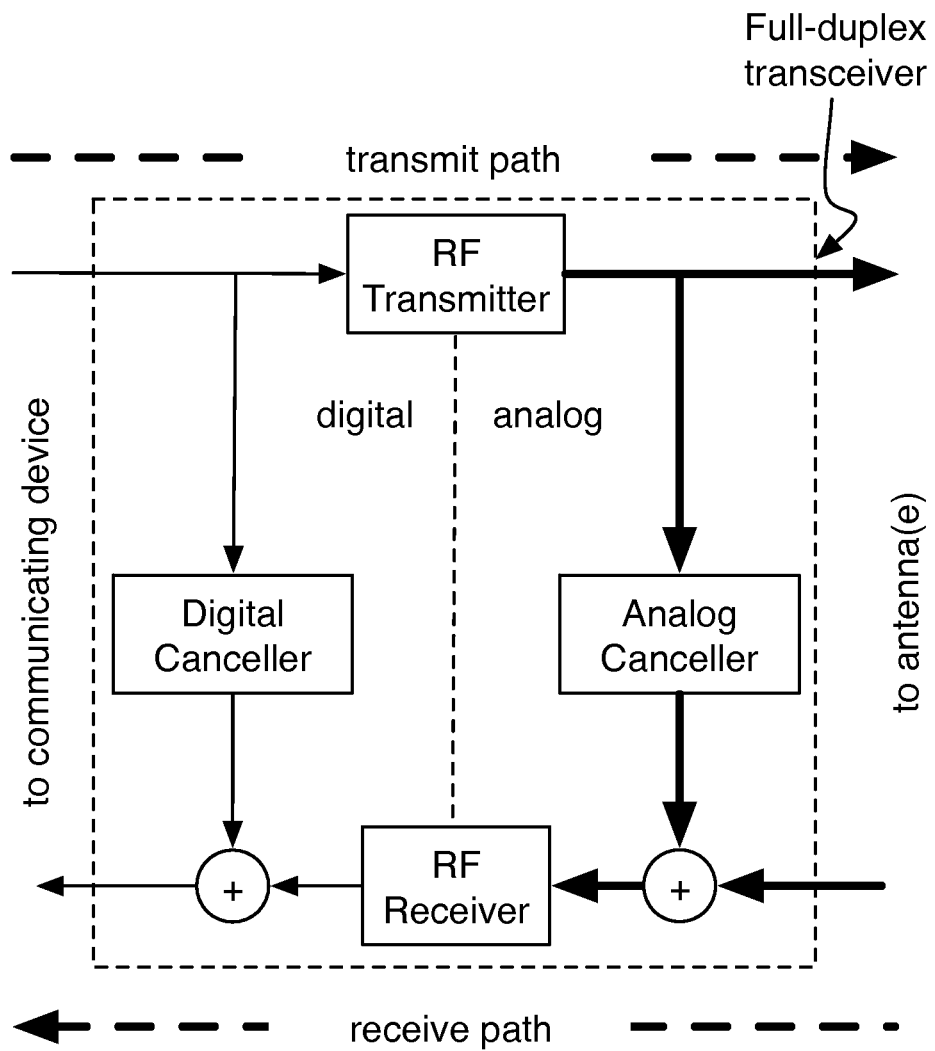
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system. The analog cancellation system removes a first portion of self-interference by summing delayed and scaled versions of the RF transmit signal to create an RF self-interference signal, which is then subtracted from the RF receive signal. Alternatively, the analog cancellation system may perform similar tasks at an intermediate frequency. After the RF (or IF) receive signal has the RF/IF self-interference signal subtracted, it passes through an analog-to-digital converter of the receiver (and becomes a digital receive signal). After this stage, a digital self-interference cancellation signal (created by transforming a digital transmit signal) is then subtracted from the digital receive signal.

This architecture is generally effective for reducing interference, but is limited by the dynamic range of the receiver; digital self-interference cancellation may not be fully effective in such an architecture unless a suitably large amount of self-interference is first removed by analog cancellation. Further, such an architecture may require the use of high dynamic range receivers, which may be prohibitively expensive. This inflexibility may limit the usefulness of a full-duplex transceiver.

The systems and methods described herein increase the performance of full-duplex transceivers as shown in FIG. 1 (and other applicable systems) by mitigating receiver dynamic range issues, thus allowing for increased effectiveness in self-interference cancellation. Other applicable systems include active sensing systems (e.g., RADAR), wired communications systems, wireless communications systems, and/or any other suitable system, including communications systems where transmit and receive bands are close in frequency, but not overlapping.

2. System for Hybrid Self-Interference Cancellation

Figure 2:
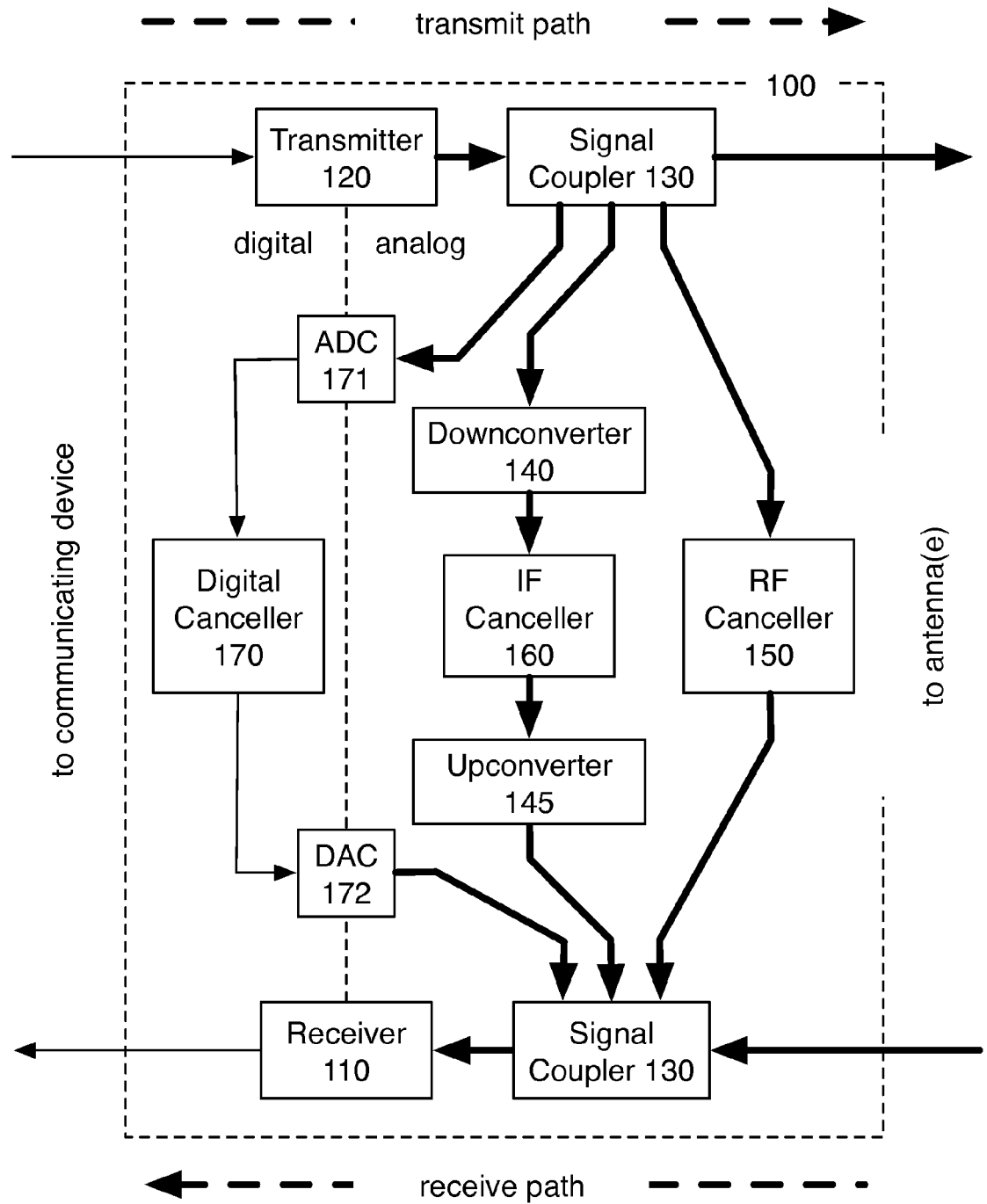
FIG. 2 is a schematic representation of a system of a preferred embodiment.

As shown in FIG. 2, a system 100 for hybrid self-interference cancellation includes a receiver 110, a transmitter 120, a signal coupler 130, a downconverter 140, an upconverter 145, a radio-frequency (RF) self-interference canceller 150, an intermediate-frequency (IF) self-interference canceller 160, and a digital self-interference canceller 170. The system 100 may additionally include a tuning circuit 180 and/or a delayer 190.

The system 100 functions to increase the performance of full-duplex transceivers (or other applicable systems) by performing hybrid self-interference cancellation. The system 100 preferably performs hybrid self-interference cancellation by performing RF, IF, and digital self-interference cancellation based on a single sampled analog transmit signal, but may additionally or alternatively perform hybrid self-interference cancellation by performing RF, IF, and digital self-interference cancellation based on any number of sampled analog and/or digital transmit signals.

The system 100 preferably performs RF, IF, and digital self-interference cancellation simultaneously and in parallel, but may additionally or alternatively perform RF, IF, and/or digital self-interference cancellation at any suitable times and in any order.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The receiver 110 functions to receive analog receive signals transmitted over a communications link (e.g., a wireless channel, a coaxial cable). The receiver 110 preferably converts analog receive signals into digital receive signals for processing by a communications system, but may additionally or alternatively not convert analog receive signals (passing them through directly without conversion).

The receiver 110 is preferably a radio-frequency (RF) receiver, but may additionally or alternatively be any suitable receiver.

The receiver 110 is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver 110 may be coupled to the communications link by a circulator-coupled RF antenna.

Figure 3:
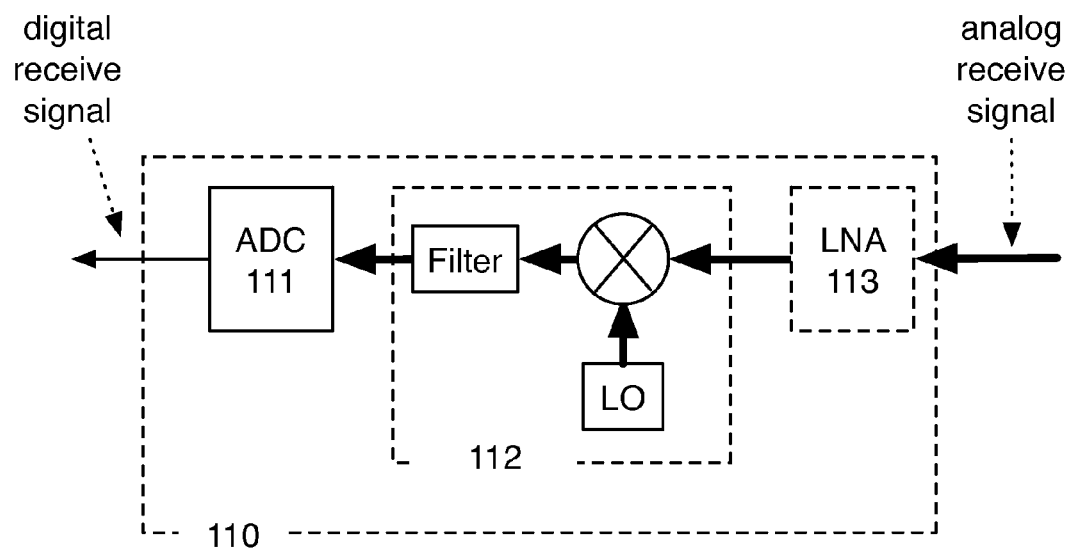
FIG. 3 is a schematic representation of a receiver of a system of a preferred embodiment.

The receiver 110 preferably includes an analog-to-digital converter (ADC) in and a frequency downconverter 112, as shown in FIG. 3. The receiver 110 may additionally include a low-noise amplifier 113. The receiver 110 may additionally or alternatively include amplifiers, filters, signal processors and/or any other suitable components. In one variation of a preferred embodiment, the receiver 110 includes only analog processing circuitry (e.g., amplifiers, fillers, attenuators, delayers). The receiver may function to scale, shift, and/or otherwise modify the receive signal. The downconverter 112 functions to downconvert the analog receive signal from RF (or any other suitable frequency) to a baseband analog receive signal, and the analog-to-digital converter (ADC) 111 functions to convert the baseband analog receive signal to a digital receive signal.

The ADC 111 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

The frequency downconverter 112 functions to downconvert the carrier frequency of the analog receive signal to baseband, preparing it for conversion to a digital receive signal. The downconverter 112 preferably accomplishes signal downconversion using heterodyning methods, but may additionally or alternatively use any suitable upconversion methods.

The downconverter 112 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter. The baseband filter is preferably a passive filter, but may additionally or alternatively be an active filter. The baseband filter is preferably implemented with analog circuit components, but may additionally or alternatively be digitally implemented.

The transmitter 120 functions to transmit signals of the communications system over a communications link to a second communications system. The transmitter 120 preferably converts digital transmit signals into analog transmit signals.

The transmitter 120 is preferably a radio-frequency (RF) transmitter, but may additionally or alternatively be any suitable transmitter.

The transmitter 120 is preferably coupled to the communications link by a duplexer-coupled RF antenna, but may additionally or alternatively be coupled to the communications link in any suitable manner. Some examples of alternative couplings include coupling via one or more dedicated transmit antennas. In another alternative coupling, the transmitter 120 may be coupled to the communications link by a duplexer-coupled RF antenna.

Figure 4:
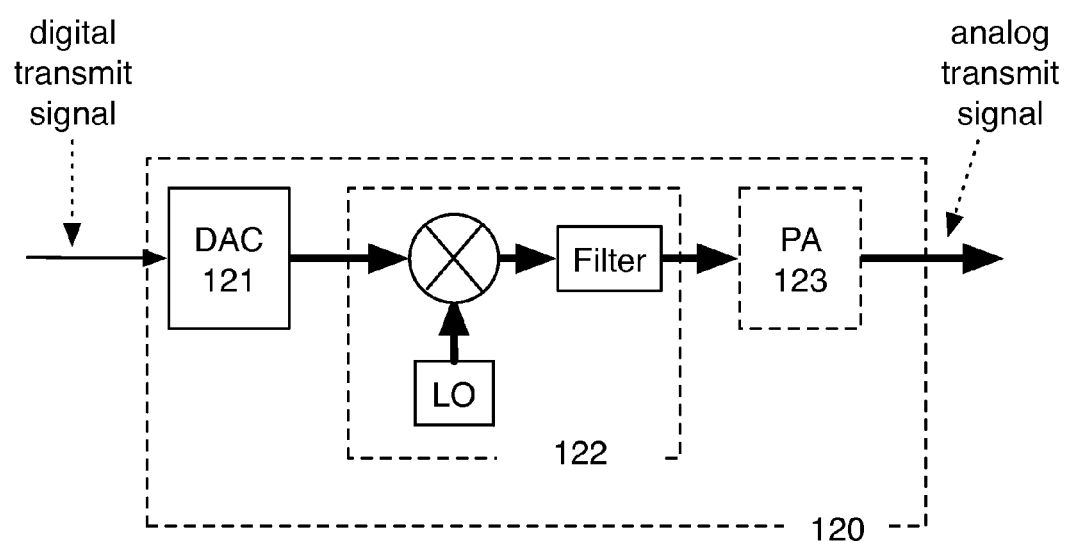
FIG. 4 is a schematic representation of a transmitter of a system of a preferred embodiment.

The transmitter 120 preferably includes a digital-to-analog converter (DAC) 121 and a frequency upconverter 122, as shown in FIG. 4. The transmitter 120 may additionally include a power amplifier 123. The transmitter 120 may additionally or alternatively include amplifiers, filters, signal processors and/or any other suitable components. The transmitter 120 may function to scale, shift, and/or otherwise modify the transmit signal. The digital-to-analog converter (DAC) 121 functions to convert the digital transmit signal to a baseband analog transmit signal, and the upconverter 122 functions to upconvert the baseband analog transmit signal from baseband to RF (or any other intended transmission frequency).

The DAC 121 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The frequency upconverter 122 functions to upconvert the carrier frequency of the baseband analog transmit signal to a radio frequency, preparing it for transmission over the communications link. The upconverter 122 preferably accomplishes signal upconversion using heterodyning methods, but may additionally or alternatively use any suitable upconversion methods.

The upconverter 122 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

Figure 5A:
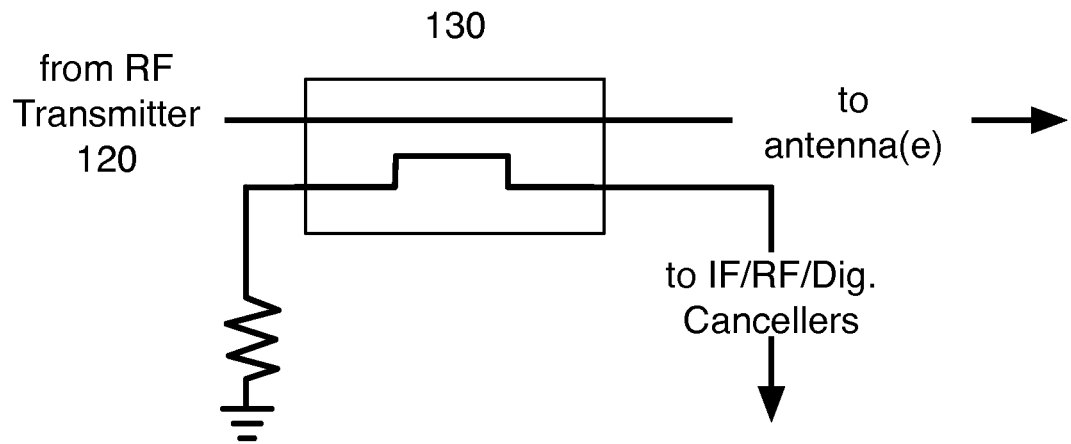
FIGS. 5A and 5B are schematic representations of signal couplers of a system of a preferred embodiment.
Figure 5B:
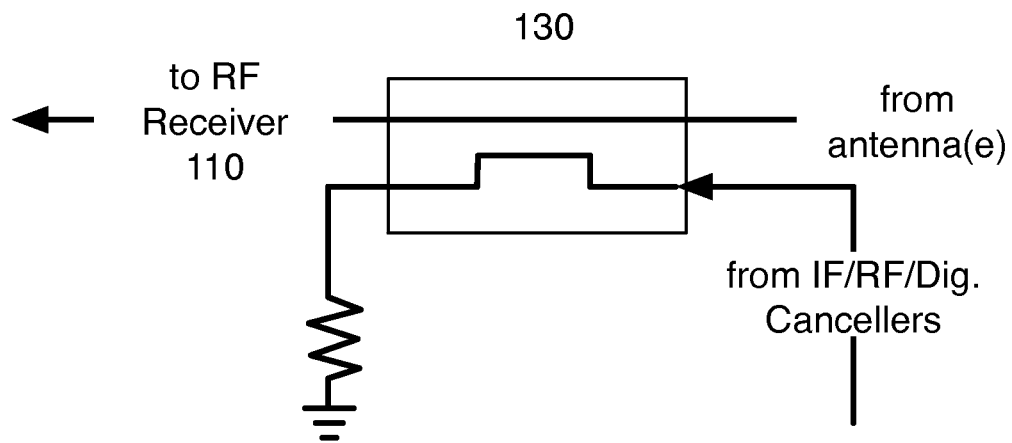

The signal coupler 130, as shown in FIGS. 5A and 5B, functions to allow signals to be split and/or joined. The signal coupler 130 may be used to provide a sample of the analog transmit signal for the RF canceller 150, the IF canceller 160, and/or the digital canceller 170, as shown in FIG. 5A; that is, the signal coupler 130 may serve as a transmit coupler. The signal coupler 130 may also be used to combine one or more analog self-interference cancellation signals (from RF/IF/digital cancellers) with the analog receive signal, as shown in FIG. 5B; that is, the signal coupler 130 may serve as a receive coupler. Additionally or alternatively, the signal coupler 130 may be used for any other purpose.

If the signal coupler 130 is used as a transmit coupler (which is assumed for the remainder of this section), the signal coupler 130 is preferably directly coupled to the transmitter 120, but may additionally or alternatively be coupled indirectly to the transmitter 120 and/or be coupled to another suitable RF transmission source. The signal coupler 130 preferably has at least two outputs; one coupled to antenna(e) (directly or indirectly) and another coupled to one or more of the RF canceller 150, the IF canceller 160, and the digital canceller 170. The signal coupler 130 preferably routes the majority of input power to the antenna(e) output port, but may additionally or alternatively route power in any suitable manner (e.g., routing the majority of power to other output ports). The signal coupler 130 may have any number of input and output ports, including bidirectional input/output ports.

If the signal coupler 130 is used as a receive coupler (which is assumed for the remainder of this section), the receive coupler is preferably directly to the receiver no, but may additionally or alternatively be coupled indirectly to the receiver no and/or be coupled to another suitable RF receiver. The signal coupler 130 preferably has at least two inputs, one coupled to antenna(e) of the full-duplex radio (directly or indirectly) and another coupled to one or more of the RF canceller 150, the IF canceller 160, and the digital canceller 170. The signal coupler 130 preferably couples the majority of power from both input ports to the receiver output port; this coupling preferably results in the receiver output port outputting a sum of one or more self-interference cancellation signals (generated by 150/160/170) and the RF receive signal (received at the antenna(e)). Additionally or alternatively, the signal coupler 130 may couple or route power in any suitable manner. The signal coupler 130 may have any number of input and output ports, including bidirectional input/output ports.

The signal coupler 130 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 130 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 130 are preferably phase-shifted by ninety degrees, but may additionally or alternatively be in phase or phase shifted by a different amount.

The system 100 preferably includes two signal couplers 130 (a transmit and a receive coupler); these signal couplers 130 preferably connect to a single antenna through a duplexer or circulator, but may additionally or alternatively connect to multiple antennae. In one example, the transmit coupler and receive coupler connect to two separate antennae (e.g., a transmit antenna and a receive antenna); in another example, the transmit coupler and receive coupler both connect to the same two antennae. The transmit coupler and receive coupler may additionally or alternatively connect to any suitable RF transmit and RF receive sources (e.g., an RF signal transmitted solely over coaxial cable). There may additionally or alternatively be filters, power amplifiers, and/or any other RF signal modifying components between the couplers 130 and antennae.

The downconverter 140 functions to downconvert the carrier frequency of an RF transmit signal (the analog transmit signal sampled by a signal coupler 130) to an intermediate frequency (or, in some cases, baseband (IF=0 Hz)) preparing it for transformation by the IF canceller 160. The downconverter 140 is preferably communicatively coupled to the RF transmit signal by a signal coupler 130, and the IF canceller 160, and preferably receives RF transmit signals from the signal coupler 130, downconverts the signal to an intermediate frequency, and passes the resulting IF transmit signal to the IF canceller 160. The downconverter 140 is preferably substantially similar to the downconverter 112 (although details such as LO frequency and filter configuration may differ between the two), but may additionally or alternatively be any suitable frequency downconverter.

The upconverter 145 functions to upconvert the carrier frequency of the IF self-interference signal (received from the IF canceller 160) to a radio frequency, preparing it for combination with the RF receive signal at a signal coupler 130. The upconverter 145 is preferably communicatively coupled to the signal coupler 130 and the IF canceller 160, and preferably receives IF self-interference cancellation signals from the IF canceller 160, upconverts the signal to a radio frequency, and passes the resulting RF self-interference cancellation signal to the signal coupler 130.

Figure 6:
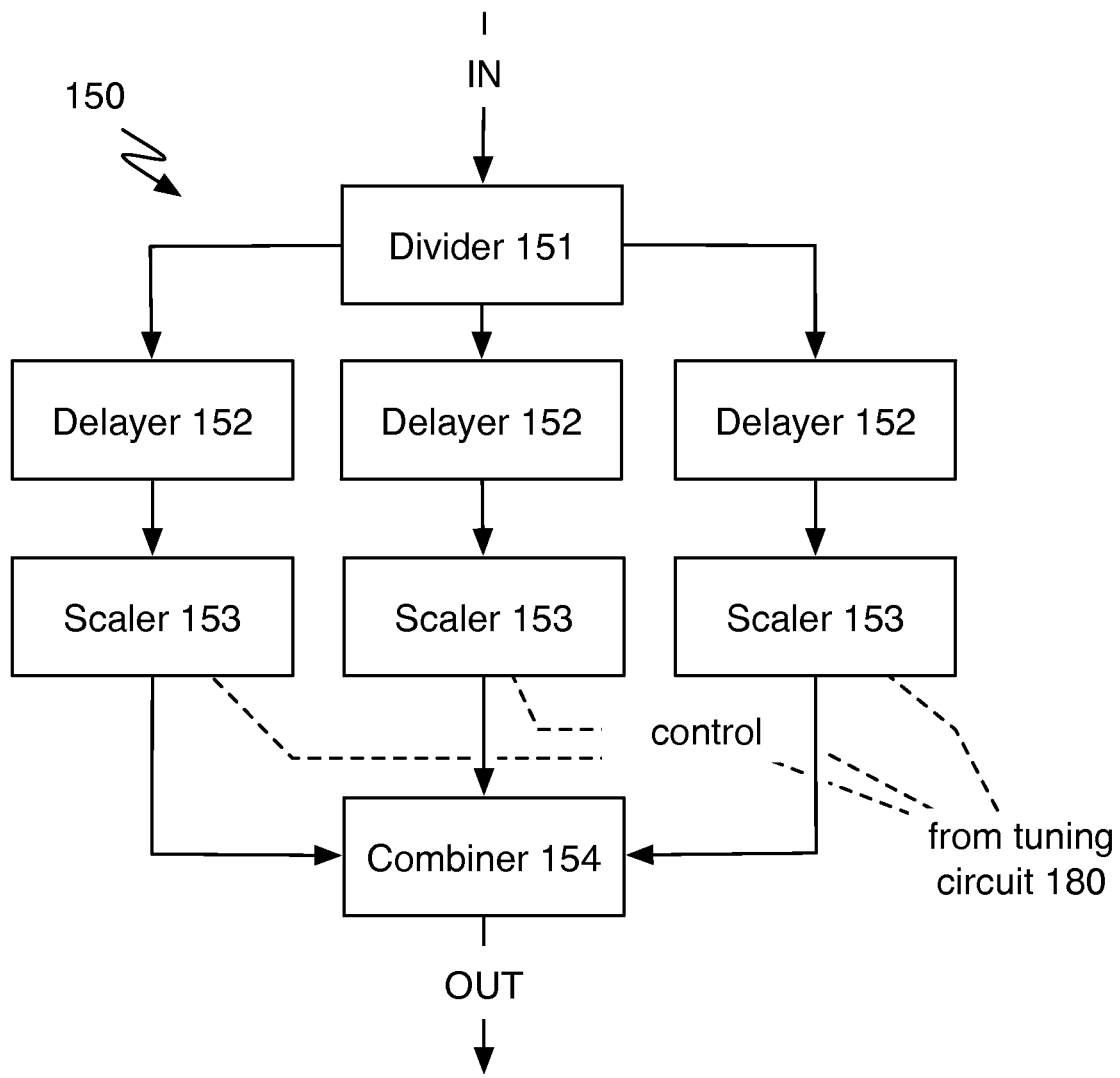
FIG. 6 is a schematic representation of an RF self-interference canceller of a system of a preferred embodiment.

The RF self-interference canceller 150, as shown in FIG. 6, functions to produce an RF self-interference cancellation signal from the analog transmit signal that can be combined with the analog receive signal to reduce self-interference present in the analog receive signal. The RF self-interference canceller 150 is preferably designed to operate at a single RF frequency band, but may additionally or alternatively be designed to operate at multiple RF frequency bands. Designing the RF self-interference canceller 150 to operate at a single RF frequency band may reduce design compromises that may be made when designing for multiple frequency bands.

The RF self-interference canceller 150 is preferably implemented as an analog circuit that transforms an RF transmit signal into an RF self-interference cancellation signal by combining a set of filtered, scaled, and/or delayed versions of the RF transmit signal, but may additionally or alternatively be implemented as any suitable circuit. For instance, the RF self-interference canceller 150 may perform a transformation involving only a single version or copy of the RF transmit signal. The transformed signal (the RF self-interference cancellation signal) preferably represents at least a part of the self-interference component received at the receiver 110.

The RF self-interference canceller 150 is preferably adaptable to changing self-interference parameters in addition to changes in the analog transmit signal; for example, RF transceiver temperature, ambient temperature, antenna configuration, humidity, and RF transmitter power. Adaptation of the RF self-interference canceller 150 is preferably performed by the tuning circuit 180, but may additionally or alternatively be performed by a control circuit or other control mechanism included in the canceller 150 or any other suitable controller.

In one implementation of the preferred embodiment, the RF self-interference canceller 150 includes a signal divider 151, delayers 152, scalers 153, and a signal combiner 154, as shown in FIG. 6. Note that while tunable filters are not explicitly shown in FIG. 6, the RF self-interference canceller may additionally include tunable filters substantially similar to those shown in FIG. 7 (tunable filters 162). In this implementation, the RF self-interference canceller 150 splits the RF transmit signal into multiple signal paths using the signal divider 151 and transforms each signal path individually before recombining them at the signal combiner 154. The RF self-interference canceller 150 preferably transforms each signal path by delaying (with the delayer 152) and scaling (with the scaler 153) signal components on each signal path.

In one implementation of the RF self-interference controller 150, the divider 151 output is coupled to the scaler 153 inputs and the scaler 153 outputs are coupled to the delayer 152 inputs. In a second implementation, the divider 151 output is coupled to the delayer 152 inputs, and the delayer 152 outputs are coupled to the scaler 153 inputs. The components of the RF self-interference controller 150 may be coupled in any manner that enables RF self-interference cancellation for the system 100.

In one implementation of the RF self-interference controller 150, each signal path includes both a scaler 153 and a delayer 152; in an alternate implementation, signal paths may include only one of a scaler 153 and a delayer 152 or neither.

The signal divider 151 functions to split the RF transmit signal into multiple transmit signal paths. The signal divider 151 preferably splits the RF transmit signal into multiple RF transmit signals having substantially the same waveform as the input RF transmit signal and equal power; the signal divider 151 may additionally or alternatively split the RF transmit signal into multiple RF transmit signals having different power levels and/or containing different waveforms than the input RF transmit signal. The signal divider 151 is preferably a transmission line power divider, but may additionally or alternatively be any suitable power divider, splitter, or coupler. The signal divider 151 may additionally contain any suitable electronics for pre-processing the RF transmit signal; for example, the signal divider 151 may contain an amplifier to increase the power contained in one or more of the output RF transmit signals.

The delayers 152 function to delay RF transmit signal components. The delay introduced by each delayer 152 (also referred to as a delayer delay) is preferably fixed (i.e., the delayer 152 is a fixed delayer), but delayers 152 may additionally or alternatively introduce variable delays. The delayer 152 is preferably implemented as an analog delay circuit (e.g., a bucket-brigade device, a long transmission line, a series of RC networks) but may additionally or alternatively be implemented in any other suitable manner. If the delayer 152 is a variable delayer, the delay introduced is preferably set by the tuning circuit 180, but may additionally or alternatively be set in any suitable manner.

The scalers 153 function to scale RF transmit signal components; specifically, the scalers 153 effectively multiply the RF transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. The scalers 153 provide the weighting for the combination of RF self-interference components at the signal combiner 154 (e.g., a signal with scale factor 2 is weighted twice as heavily as one with a scale factor of 1).

The scalers 153 may include attenuators, amplifiers, phase inverters, and/or any other suitable components for scaling RF transmit signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits and/or inverting amplifiers.

The scalers 153 preferably are capable of attenuation, gain, and phase inversion, but may alternatively be capable only of a subset of said capabilities. Each scaler 153 preferably includes all three capabilities in a single device (e.g., an amplifier with tunable gain and two outputs, one inverted and one non-inverted) but may additionally or alternatively separate capabilities into different sections (e.g., an amplifier with tunable gain but 110 inversion capability, along with a separate phase inversion circuit). The scalers 153 are preferably controlled by the tuning circuit 180, but may additionally or alternatively be controlled in any suitable manner. The tuning circuit 180 preferably controls scalers 153 by dynamically setting scale factors for each scaler 153, but may additionally or alternatively control scalers 153 in any suitable manner.

After transformation by a scaler 153 and/or a delayer 152, RF transmit signal components are transformed into RF self-interference cancellation signal components, which may be combined to form an RF self-interference cancellation signal.

The signal combiner 154 functions to combine the RF self-interference cancellation signal components into an RF self-interference cancellation signal; the RF self-interference cancellation signal may then be combined with an RF receive signal to remove self-interference. The signal combiner 154 preferable combines RF self-interference cancellation signal components (resulting from multiple signal paths) and outputs the resulting RF self-interference cancellation signal. The signal combiner 154 is preferably a transmission line coupler, but may additionally or alternatively be any suitable type of coupler (described in the signal coupler 130 sections). The signal combiner 154 may additionally contain any suitable electronics for post-processing the RF self-interference cancellation signal before outputting it; for example, the signal combiner 154 may contain an amplifier to increase the power of the RF self-interference cancellation signal.

The IF analog self-interference canceller 160 functions to produce an IF self-interference signal from the IF transmit signal (i.e., the downconverted RF transmit signal) that, after upconversion, can be combined with the RF receive signal to reduce self-interference present in the RF receive signal. The IF analog self-interference canceller 160 is preferably designed to operate at a single IF frequency band, but may additionally or alternatively be designed to operate at multiple IF frequency bands. Designing the IF analog self-interference canceller 160 to operate at a single IF frequency band may reduce design compromises that may be made when designing for multiple frequency bands. Because the downconverter 140 and upconverter 145 may enable signals of multiple RF frequency bands to be converted to the same IF frequency band; an IF analog self-interference canceller 160 operating at a single IF band may still perform self-interference cancellation for multiple RF frequency bands.

The IF analog self-interference canceller 160 preferably is designed to operate at an intermediate frequency that decreases the component and/or design complexity of the IF analog self-interference canceller 160 required to reach a particular quality threshold. For instance, if it is desired to use a PCB having a certain minimum distance between traces for the IF analog self-interference canceller 160, it may be desired to choose an intermediate frequency where the capacitance between traces is not a substantial effect on circuit performance. Additionally or alternatively, the IF analog self-interference canceller 160 may operate at any suitable frequency.

The IF analog self-interference canceller 160 is preferably implemented as an analog circuit that transforms an IF transmit signal into an IF self-interference signal by combining a set of filtered, scaled, and/or delayed versions of the IF transmit signal, but may additionally or alternatively be implemented as any suitable circuit. For instance, the IF analog self-interference canceller 160 may perform a transformation involving only a single version or copy of the IF transmit signal. The transformed signal (the IF self-interference signal) preferably represents at least a part of the self-interference component received at the receiver 110.

The IF analog self-interference canceller 160 is preferably adaptable to changing self-interference parameters in addition to changes in the IF transmit signal; for example, RF transceiver temperature, ambient temperature, antenna configuration, humidity, and RF transmitter power. Adaptation of the IF analog self-interference canceller 160 is preferably performed by the tuning circuit 180, but may additionally or alternatively be performed by a control circuit or other control mechanism included in the canceller 160 or any other suitable controller.

Figure 7:
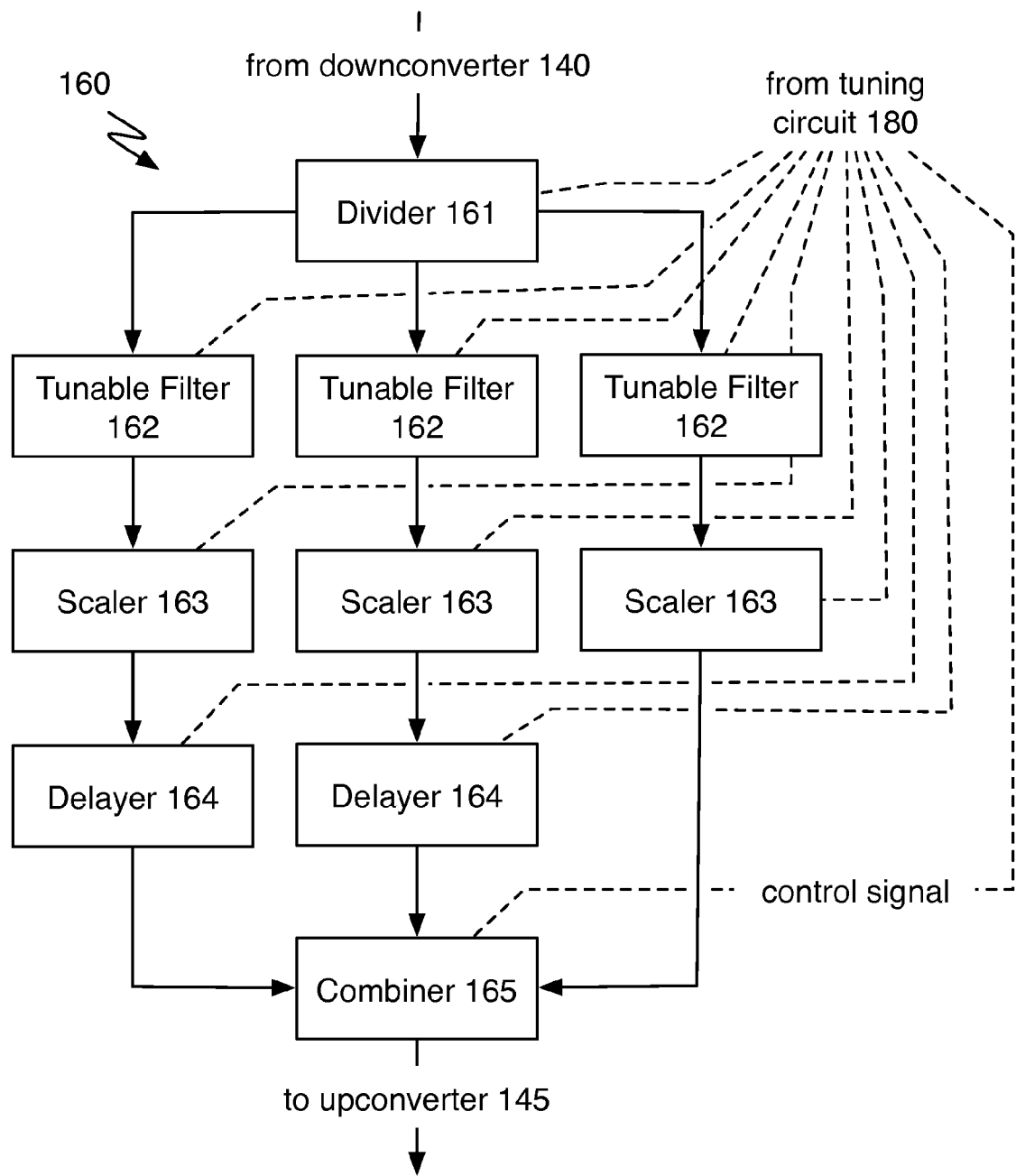
FIG. 7 is a schematic representation of an IF self-interference canceller of a system of a preferred embodiment.
Figure 8:
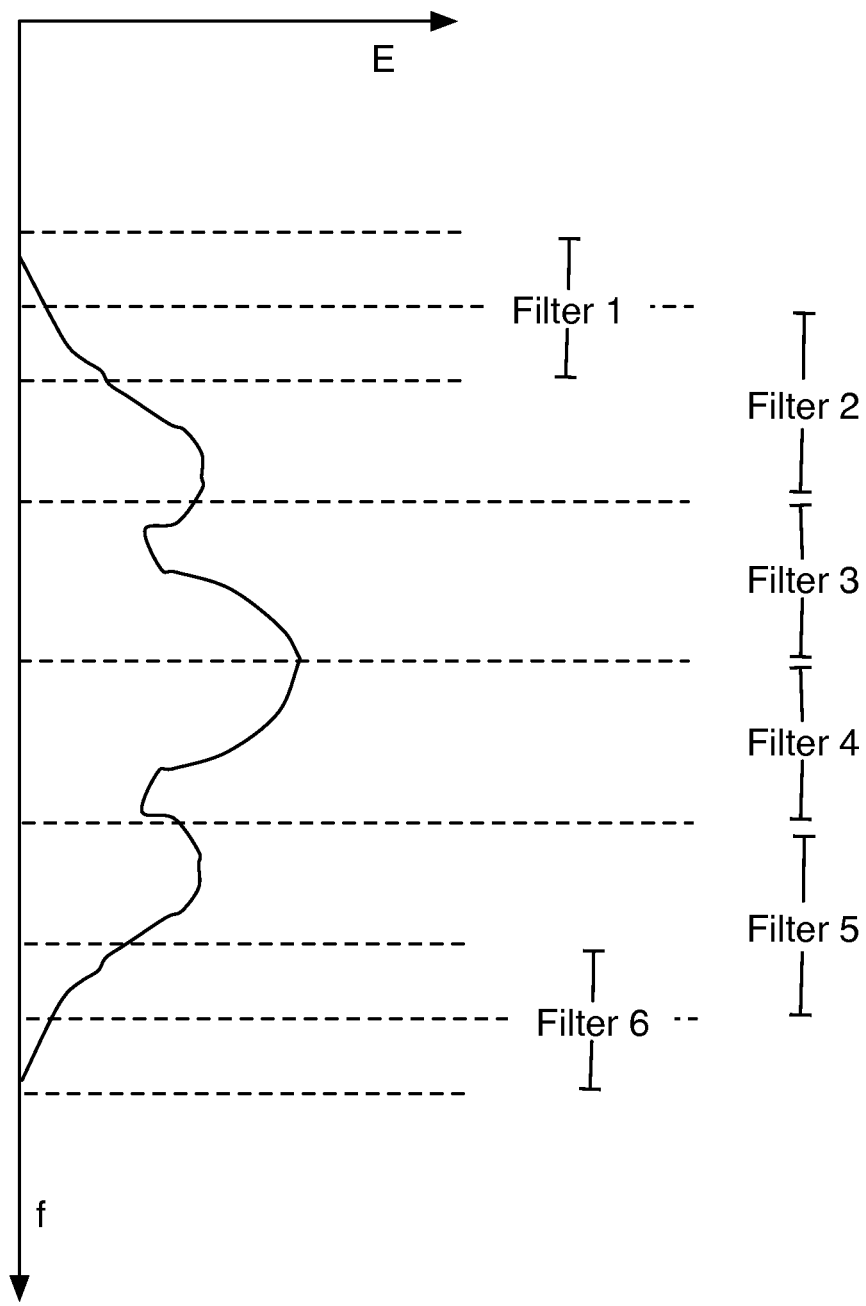
FIG. 8 is a frequency spectrum view of signal frequency sub-bands.

In one implementation of the preferred embodiment, the IF analog self-interference canceller 160 includes a signal divider 161, tunable filters 162, scalers 163, delayers 164, and a signal combiner 165, as shown in FIG. 7. In this implementation, the IF analog self-interference canceller 160 splits the IF transmit signal into sub-bands using the tunable filters 162, as shown in FIG. 8, and transforms each of these sub-bands individually before recombining them at the signal combiner 166. Note that the frequency sub-bands may overlap in frequency; there may additionally or alternatively be multiple filters 162 corresponding to the same frequency sub-band. Additionally or alternatively, some tunable filters 162 may pass the entire IF band. The IF analog self-interference canceller 160 preferably transforms each sub-band by scaling (with the scaler 163) and delaying (with the delayer 164) signal components of each sub-band. In one implementation of the IF analog self-interference controller 160, the tunable filter 162 output is coupled to the scaler 163 input and the scaler 163 output is coupled to the delayer 164 input. In a second implementation, the tunable filter 162 output is coupled to the delayer 164 input, and the delayer 164 output is coupled to the scaler 163 input. The components of the IF analog self-interference controller 160 may be coupled in any manner that enables analog self-interference cancellation for the system 100. In one implementation of the IF analog self-interference controller 130, each signal path (i.e., each path associated with a different tunable filter 162) includes both a scaler 163 and a delayer 164; in an alternate implementation, signal paths may include only one of a scaler 163 and a delayer 164 or neither.

Separating the IF transmit signal into sub-bands enables the IF analog self-interference canceller 160 to generate an effective self-interference signal even when self-interference is highly variable with frequency; for instance, in situations where the full-duplex radio has an antenna configuration not optimized for its RF frequency, where the full-duplex radio is placed in a very strong multipath environment, and/or where the receiver 110 exhibits a substantially frequency-dependent response to RF signal input.

The signal divider 161 functions to split the IF transmit signal into multiple IF transmit signal paths, each directed to a tunable filter 162. The signal divider 161 is preferably substantially similar to the signal divider 151, but may additionally or alternatively be any suitable signal divider.

Each tunable filter 162 functions to isolate IF transmit signal components contained within a frequency band (typically, but not always, a sub-band of the IF transmit signal band) so that the component of self-interference resulting from the part of the IF transmit signal in that frequency band may be generated independently of the components of self-interference resulting from other parts of the IF transmit signal. As previously discussed, isolating IF transmit signal components by frequency sub-band allows for transformations to be performed on each signal component individually, increasing self-interference cancellation performance in situations where self-interference is substantially frequency dependent.

The tunable filters 162 are preferably bandpass filters centered around a tunable intermediate frequency. Additionally or alternatively, the tunable filters 162 may be bandpass filters centered around set radio frequencies, or any other suitable type of filter. The tunable filters 162 are preferably passive filters, but may additionally or alternatively be active filters. The tunable filters 162 are preferably implemented with analog circuit components, but may additionally or alternatively be digitally implemented. The center frequency of each tunable filter 162 is preferably controlled by the tuning circuit 180, but may additionally or alternatively be controlled by any suitable system (including manually controlled, e.g. as in a mechanically tuned capacitor). Each tunable filter 162 preferably has a set quality (Q) factor, but may additionally or alternatively have a variable Q factor. The tunable filters 162 may have different Q factors; for example, some of the tunable filters 162 may be high-Q, some may be low-Q, and some may be no-Q (flat response).

The scalers 163 function to scale IF transmit signal components; specifically, the scalers 153 effectively multiply the IF transmit signal components by a scale factor. The scalers 163 are preferably substantially similar to the scalers 153, but may additionally or alternatively be any suitable scalers.

The delayers 164 function to delay IF transmit signal components, preferably to match corresponding delays in received self-interference. The delayers 154 are preferably substantially similar to the delayers 152, but may additionally or alternatively be any suitable delayers.

After transformation by a scaler 163 and/or a delayer 164, IF transmit signal components are transformed into IF self-interference signal components, which may be combined to form an IF self-interference signal.

The signal combiner 165 functions to combine the IF self-interference signal components into an IF self-interference signal; the IF self-interference signal may then be upconverted into an RF self-interference signal and combined with an RF receive signal to remove self-interference. The signal combiner 165 is preferably substantially similar to the signal combiner 154, but may additionally or alternatively be any suitable signal combiner.

The digital self-interference canceller 170 functions to produce a digital self-interference cancellation signal from a digital transmit signal. The digital self-interference cancellation signal is preferably converted to an analog self-interference cancellation signal (by the DAC 172) and combined with the IF and RF self-interference cancellation signals to further reduce self-interference present in the RF receive signal at the receiver 110. Additionally or alternatively, the digital self-interference cancellation signal may be combined with a digital receive signal.

The digital self-interference canceller 170 preferably samples the RF transmit signal of the transmitter 120 using the ADC 171 (additionally or alternatively, the canceller 170 may sample the digital transmit signal or any other suitable transmit signal) and transforms the sampled and converted RF transmit signal to a digital self-interference signal based on a digital transform configuration. The digital transform configuration preferably includes settings that dictate how the digital self-interference canceller 170 transforms the digital transmit signal to a digital self-interference signal (e.g. coefficients of a generalized memory polynomial used to transform the transmit signal to a self-interference signal).

The digital self-interference canceller 170 may be implemented using a general-purpose processor, a digital signal processor, an application specific integrated circuit (ASIC), a field programmable gate array (FPGA) and/or any suitable processor(s) or circuit(s). The digital self-interference canceller 170 preferably includes memory to store configuration data, but may additionally or alternatively be configured using externally stored configuration data or in any suitable manner. In one implementation, the digital self-interference canceller 170 is substantially similar to the digital self-interference canceller of U.S. patent application Ser. No. 14/456, 320, filed 11 Aug. 2014, which is incorporated in its entirety by this reference.

The ADC 171 functions to convert the RF transmit signal to from an analog signal to a digital signal; this signal is hereafter referred to as a converted RF transmit signal. The ADC is preferably substantially similar to the ADC 111, but may additionally or alternatively be any suitable ADC.

The DAC 172 functions to convert the digital self-interference cancellation signal from a digital signal to an analog signal; this signal is hereafter referred to as a converted digital self-interference cancellation signal. The DAC 172 is preferably substantially similar to the DAC 121, but may additionally or alternatively be any suitable DAC.

Figure 9A:
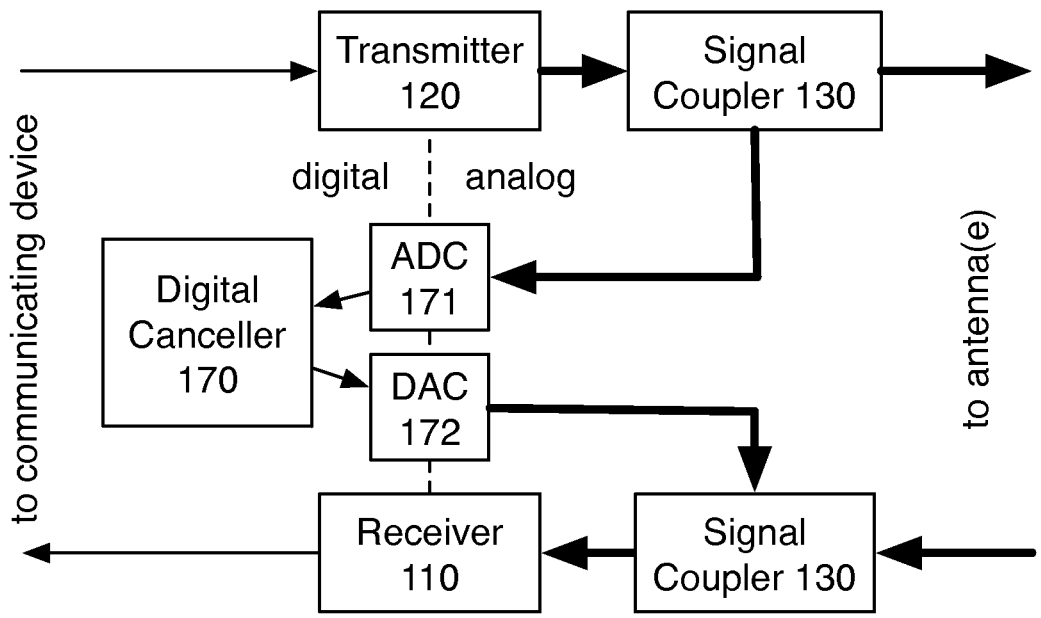
FIGS. 9A, 9B, 9C, 9D, 9E, and 9F are schematic views of digital canceller coupling of a system of a preferred embodiment.
Figure 9B:
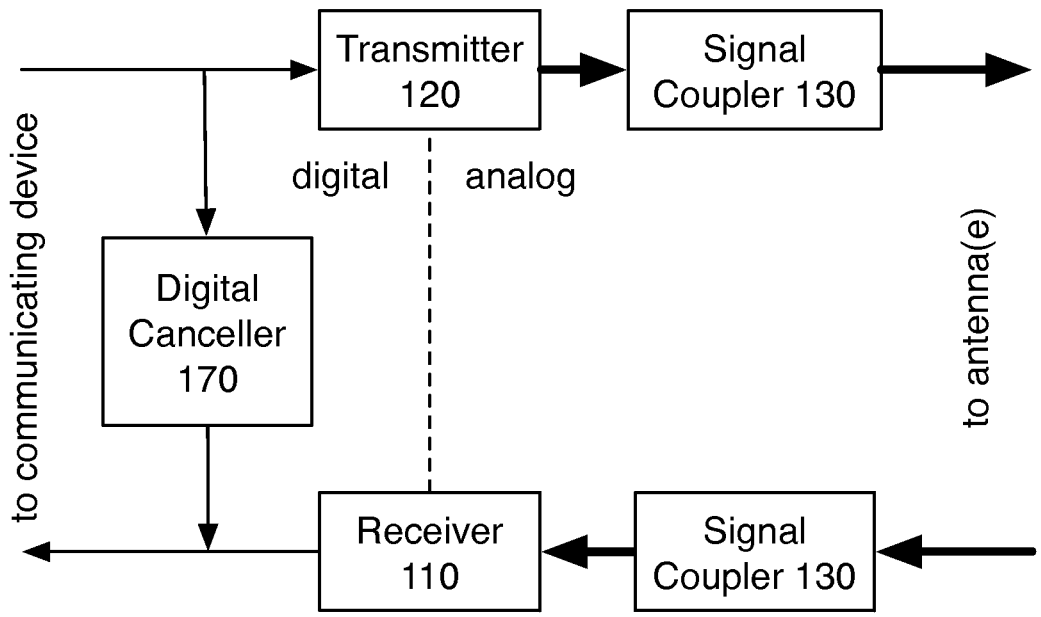
Figure 9C:
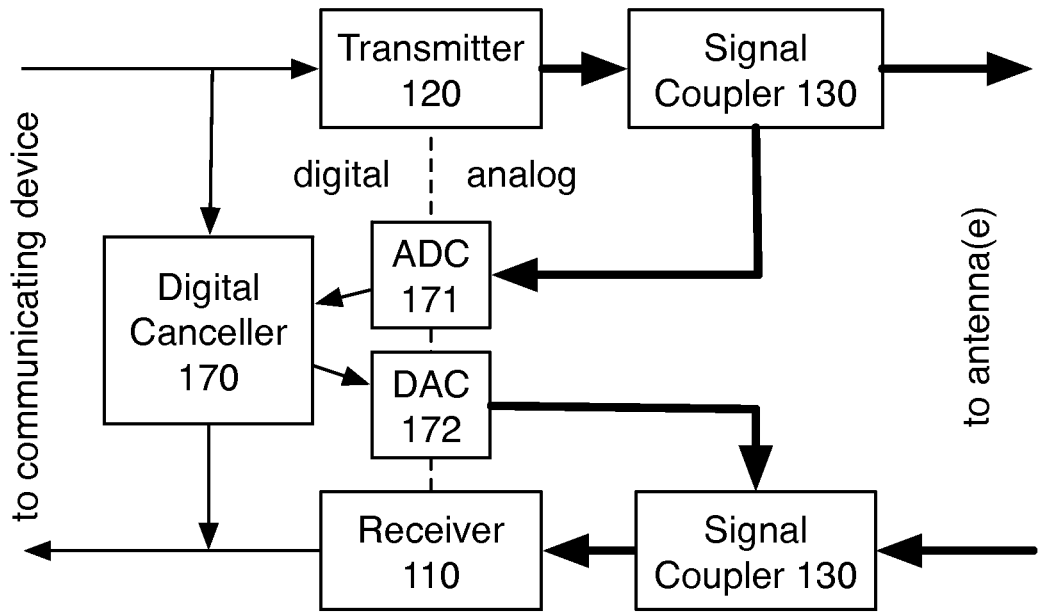
Figure 9D:
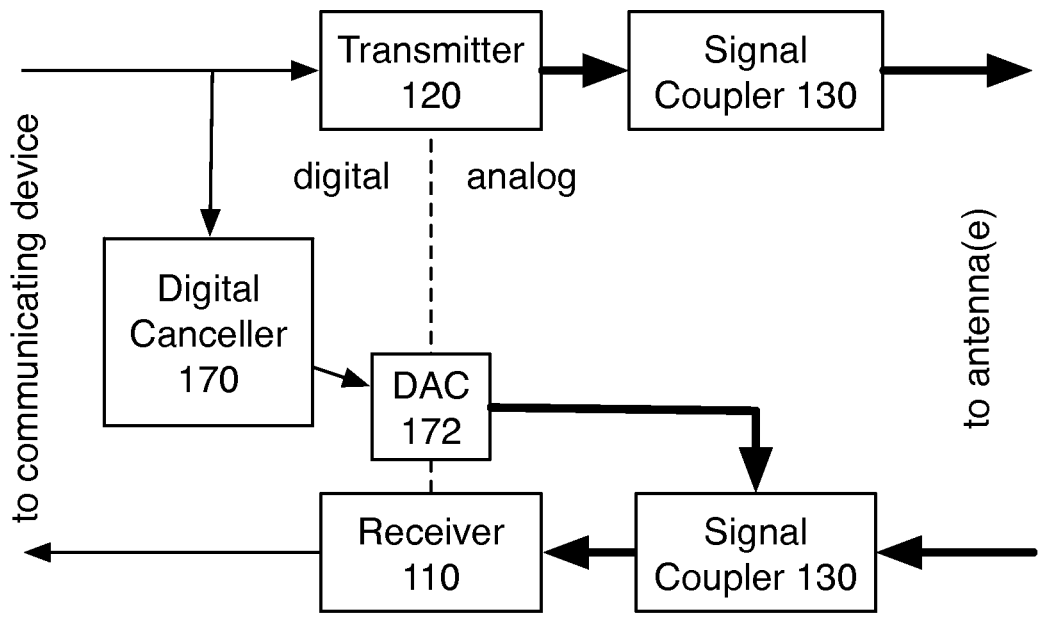
Figure 9E:
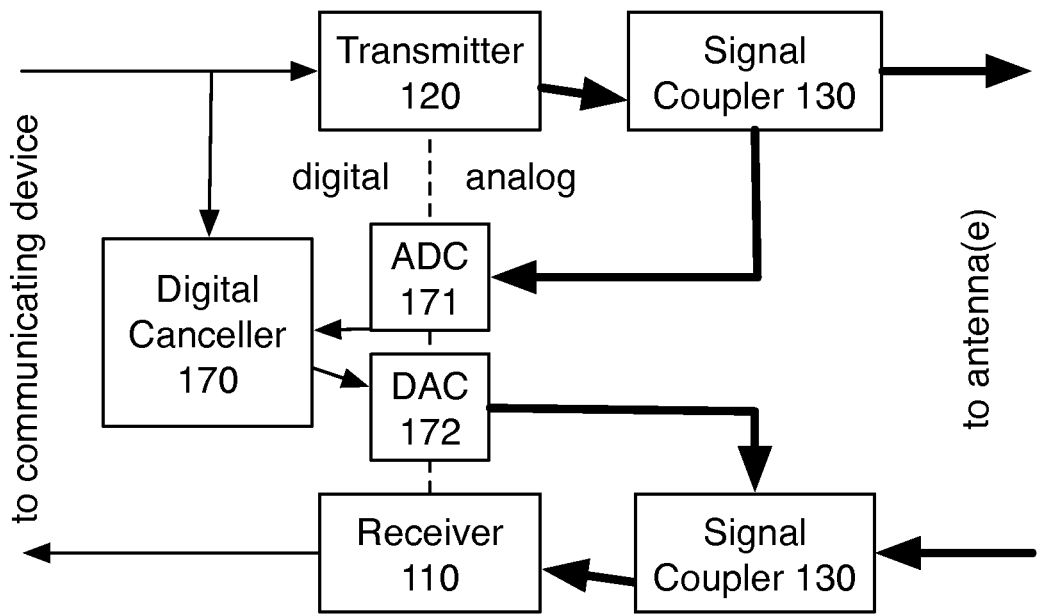
Figure 9F:
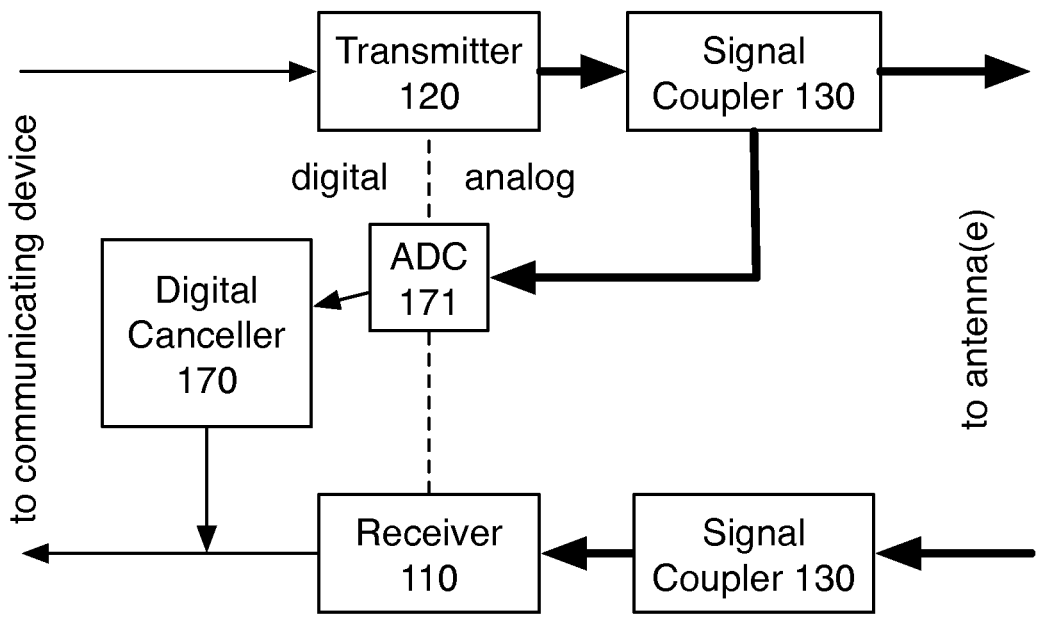

The digital self-interference canceller 170 may couple to transmit and receive signals in a number of ways. For example, as shown in FIG. 9A, the digital self-interference canceller 170 may use a converted RF transmit signal as input as well as provide a converted digital self-interference cancellation signal as output. As another example, the digital self-interference canceller 170 may use the digital transmit signal as input as a well as provide a digital self-interference cancellation signal as output (directly to the digital receive signal), as shown in FIG. 9B. The digital self-interference canceller may additionally or alternatively couple to transmit signals in any combination of digital and analog receive signals. Additional examples are as shown in FIGS. 9C, 9D, 9E, and 9F.

Figure 10A:
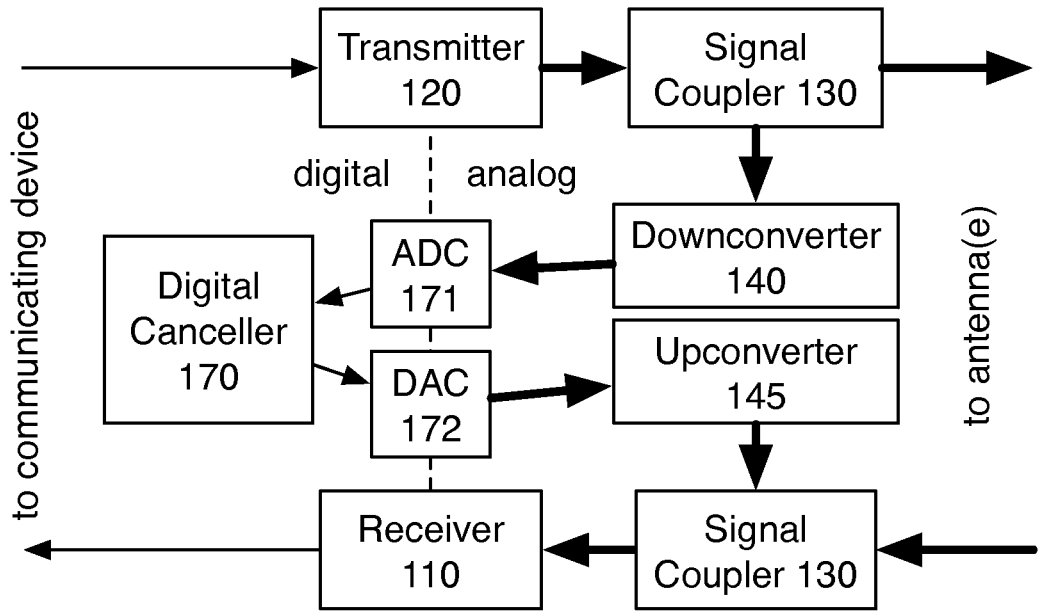
FIGS. 10A and 10B are schematic views of digital canceller coupling of a system of a preferred embodiment.
Figure 10B:
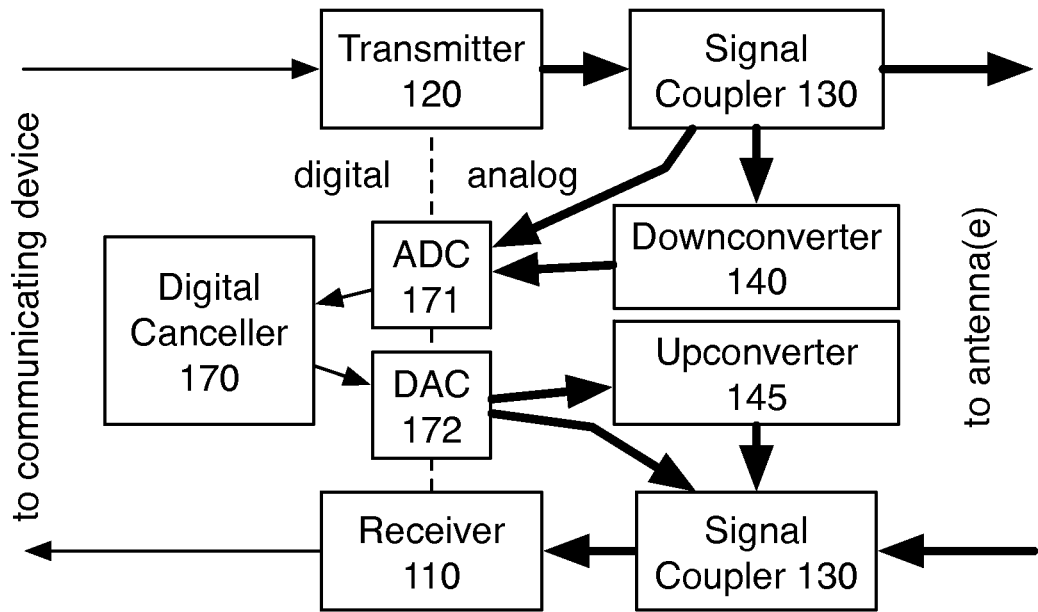

Note that while these examples reference the RF transmit signal and RF receive signal, the digital self-interference canceller 170 may additionally or alternatively couple to IF transmit signals and/or IF self-interference cancellation signals, as shown in FIGS. 10A and 10B.

Figure 11:
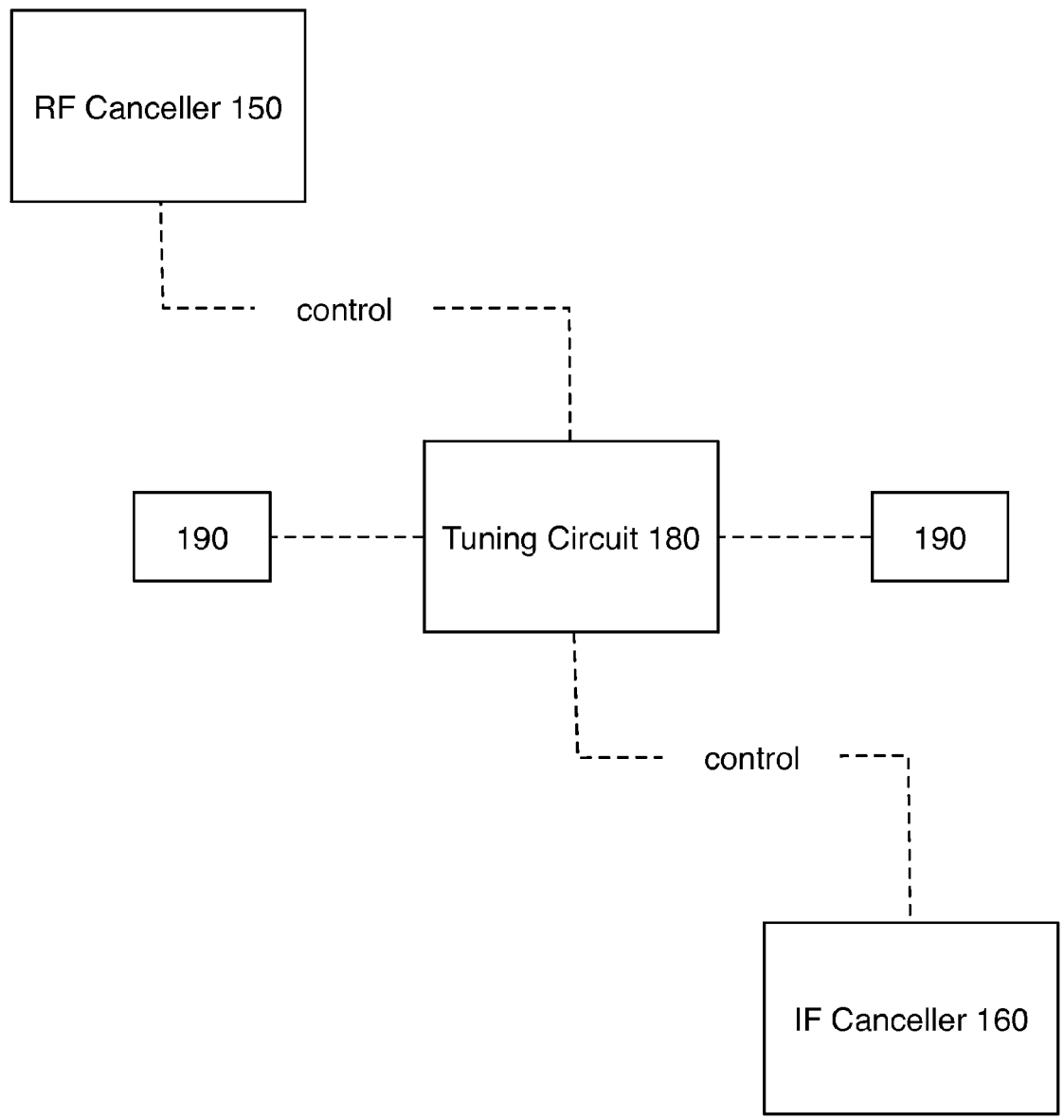
FIG. 11 is a schematic view of tuning circuit coupling of a system of a preferred embodiment.

The tuning circuit 180, as shown in FIG. 11, functions to control the configuration parameters of the RF canceller 150 and/or the IF canceller 160. The tuning circuit 180 may additionally or alternatively provide input to or control configuration parameters of the digital canceller 170. Configuration parameters may include pre-processing settings (at signal dividers 151/161), filter center frequency and/or Q factor (at tunable filters 162), scale factor (at the scalers 153/163), delay (at the delayers 152/164), post-processing settings (at the signal combiner 154/165) and/or any other suitable configuration parameters. The tuning circuit 180 preferably controls tunable filter 162 center frequencies, scaler 153/163 scale factors (including gain/attenuation/phase inversion), and delayer 154/165 delays to create RF and/or IF self-interference cancellation signals that reflect some or all of the self-interference contained within received signals.

The tuning circuit 180 preferably sets the configuration state of the RF canceller 150 and/or the IF canceller 160 (where the state includes settings for each variable setting controlled by the tuning circuit 180) based upon the received RF/IF transmit signals, but may additionally or alternatively set the configuration state based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), and/or any other input relating to self-interference present in the receive signal.

The tuning circuit 180 preferably sets configuration states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, the tuning circuit 180 may set configuration states in any suitable manner.

The tuning circuit 180 may adapt configuration states and/or configuration state generating/choosing algorithms using analytical methods, online gradient-descent methods (e.g., LMS, RLMS), and/or any other suitable methods. The tuning circuit 180 may additionally or alternatively adapt configuration states and/or configuration state generating/choosing algorithms based on test input scenarios (e.g. scenarios when the signal received by the receiver 110 is known), scenarios where there is no input (e.g. the only signal received at the receiver 110 is the signal transmitted by the transmitter 120, or scenarios where the received signal is unknown. In cases where the received signal is an unknown signal, the tuning circuit 180 may perform adaptation based on historical received data (e.g. what the signal looked like ten seconds in the past) or any other suitable information. The tuning circuit 180 may additionally or alternatively perform adaptation based on the content of the RF or IF transmit signals; for instance, if the RF transmit signal is modulated in a particular way, the tuning circuit may perform adaptation such that when the RF self-interference signal is combined with the RF receive signal the detected modulation (as an indicator of self-interference) is reduced.

The tuning circuit 180 is preferably implemented as a programmable digital circuit, but may additionally or alternatively be implemented in any suitable digital or analog circuit, including implementation as software in a general purpose computing device.

The delayer 190 functions to cause signals entering the input port to experience a delay before exiting the output port. The delay is preferably a variable delay, but may additionally or alternatively be a set delay. The variable delay is preferably set by the tuning circuit 180, but may additionally or alternatively be set in any suitable manner (e.g., manually controlled switches set by hand, electronic switches controlled by software, etc.).

The delayer 190 is preferably used to adjust for relative delays between self-interference cancellation components; for example, if the output of the IF canceller 160 lags 10 ms behind the output of the RF canceller 150, the output of the RF canceller 150 may be passed through a delayer with a 10 ms delay to temporally align the two output signals.

Delayers 190 are preferably analog delay circuits, but may additionally or alternatively be digital delay circuits or any suitable delayer. In a variation of a preferred embodiment, delayers 190 are the delay matchers of U.S. patent application Ser. No. 14/484,094, which is incorporated in its entirety by this reference.

Figure 12:
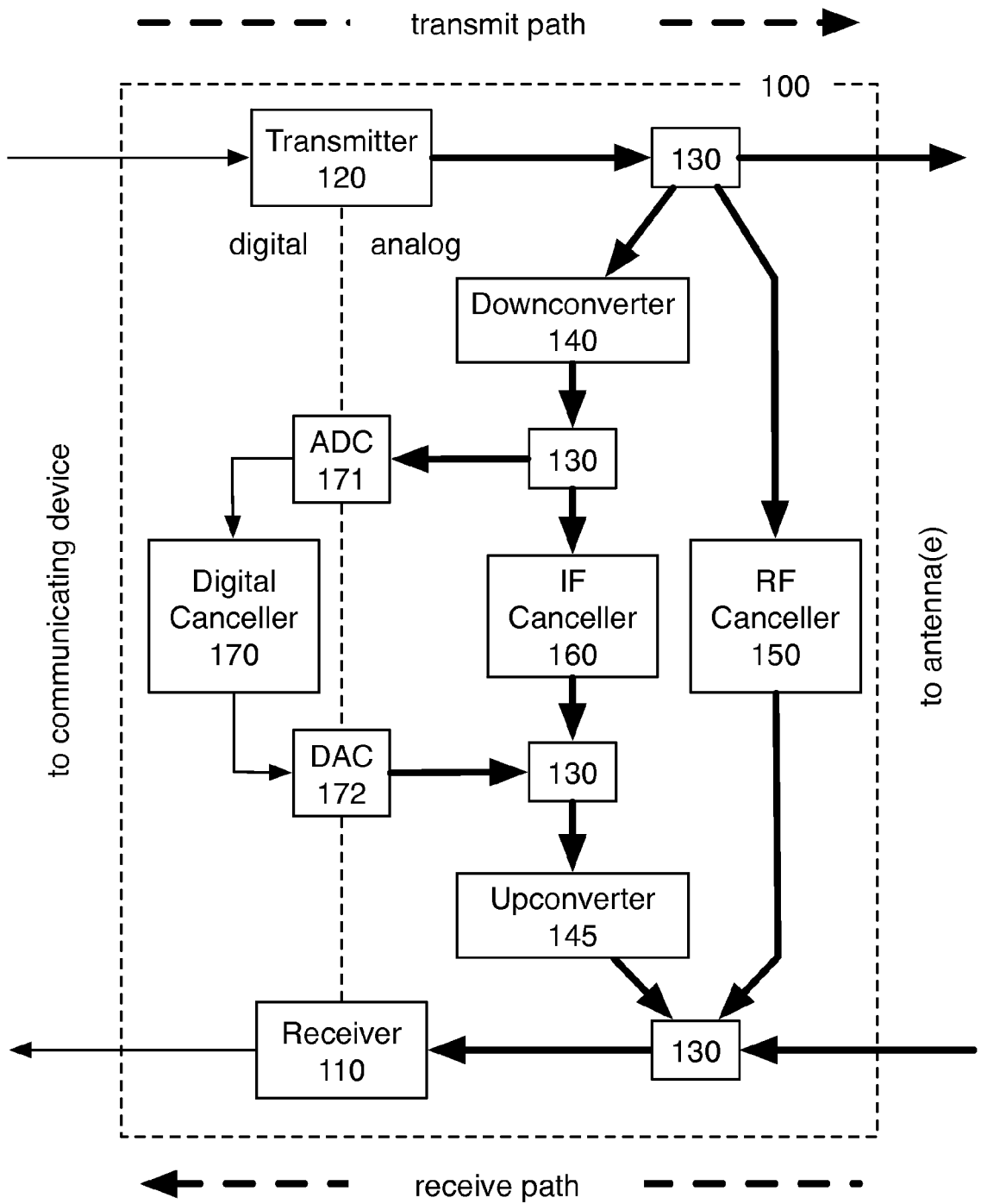
FIG. 12 is a schematic view of a system of a preferred embodiment.

As previously mentioned, the three cancellers (150, 160, 170) may be coupled to transmit and receive signals in a variety of ways. For example, as shown in FIG. 12, the input of the digital canceller 170 (through the ADC 171) may be coupled to the downconverted IF transmit signal and the output of the digital canceller (through the DAC 172) may be coupled to the IF self-interference cancellation signal (so that the upconverted self-interference cancellation signal is a combination of both the original IF self-interference cancellation signal and the output of the digital canceller 170). In this example, the digital self-interference cancellation signal is converted to a digitally-sourced IF self-interference cancellation signal and combined with the IF self-interference cancellation signal to form a hybrid self-interference cancellation signal (this term may refer to any combination of self-interference cancellation signal types).

Figure 13:
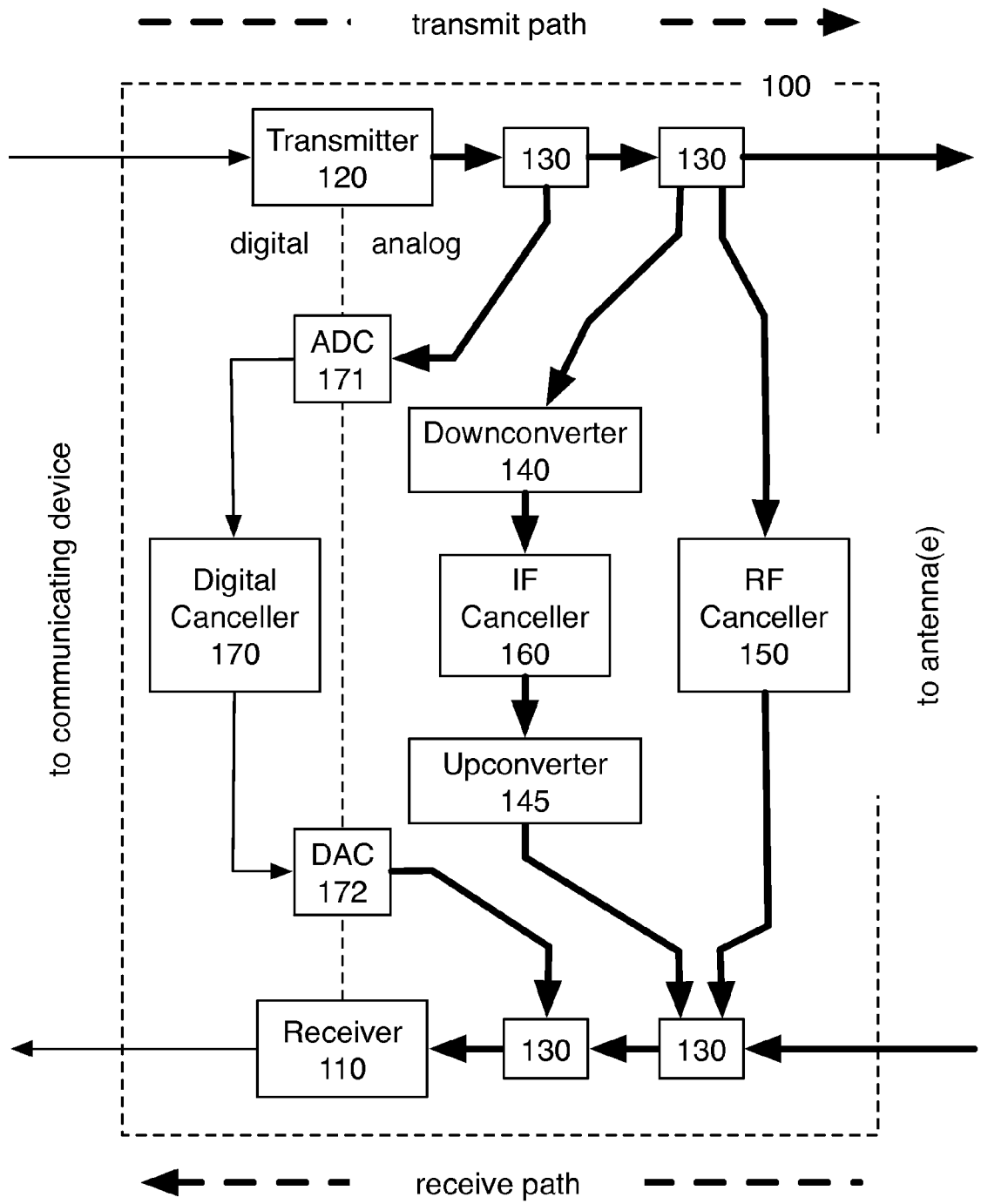
FIG. 13 is a schematic view of a system of a preferred embodiment.

As another example, as shown in FIG. 13, the digital canceller 170 may be coupled to the RF transmit and receive paths, but using a separate signal coupler 130 from the IF and RF cancellers 160 and 150.

Figure 14:
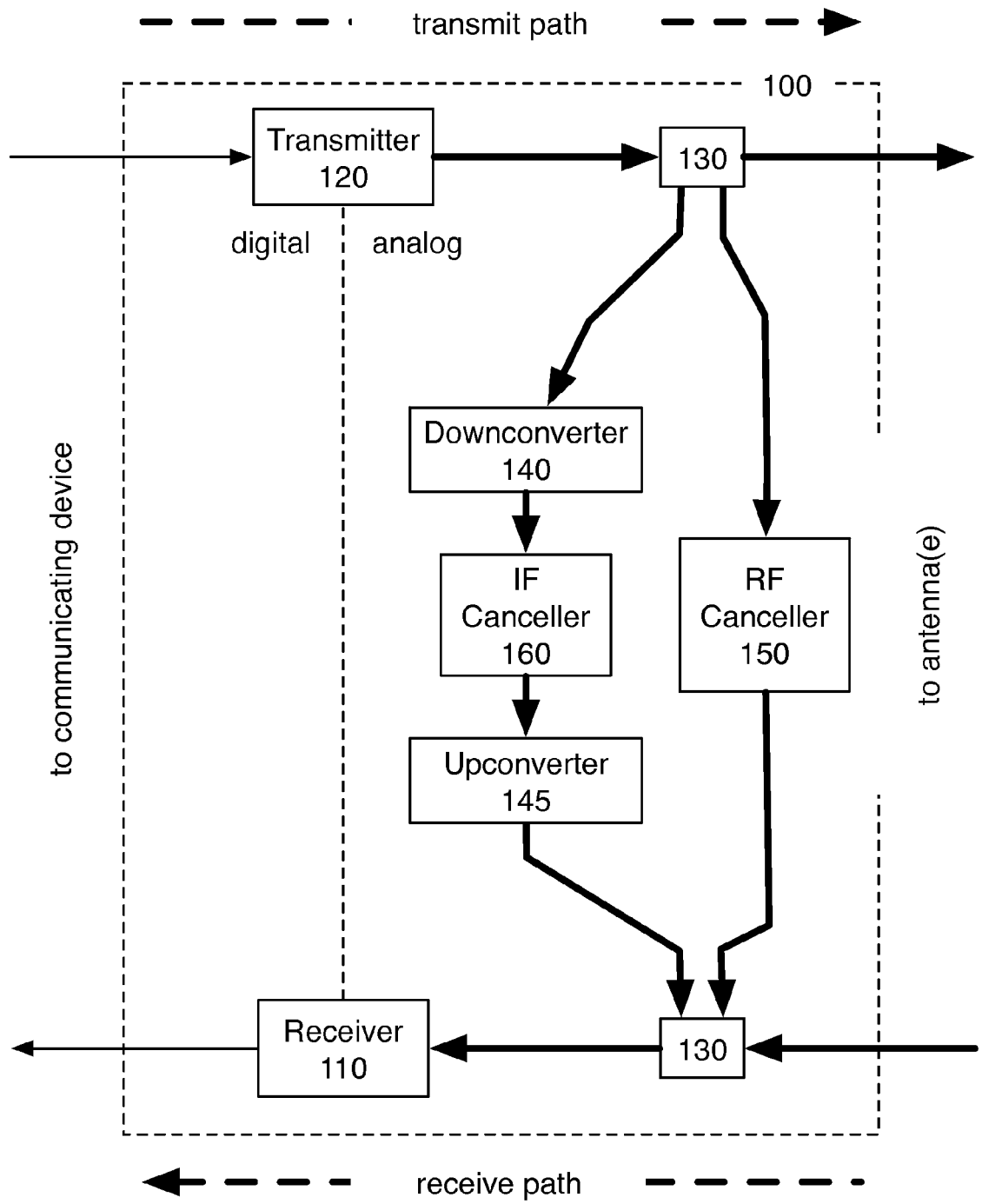
FIG. 14 is a schematic view of a system of a preferred embodiment.

In some cases, only a subset of the three cancellers may be included in the system 100. For example, as shown in FIG. 14, the system 100 may include IF and RF cancellers 160 and 150 without a digital canceller 170.

Figure 15:
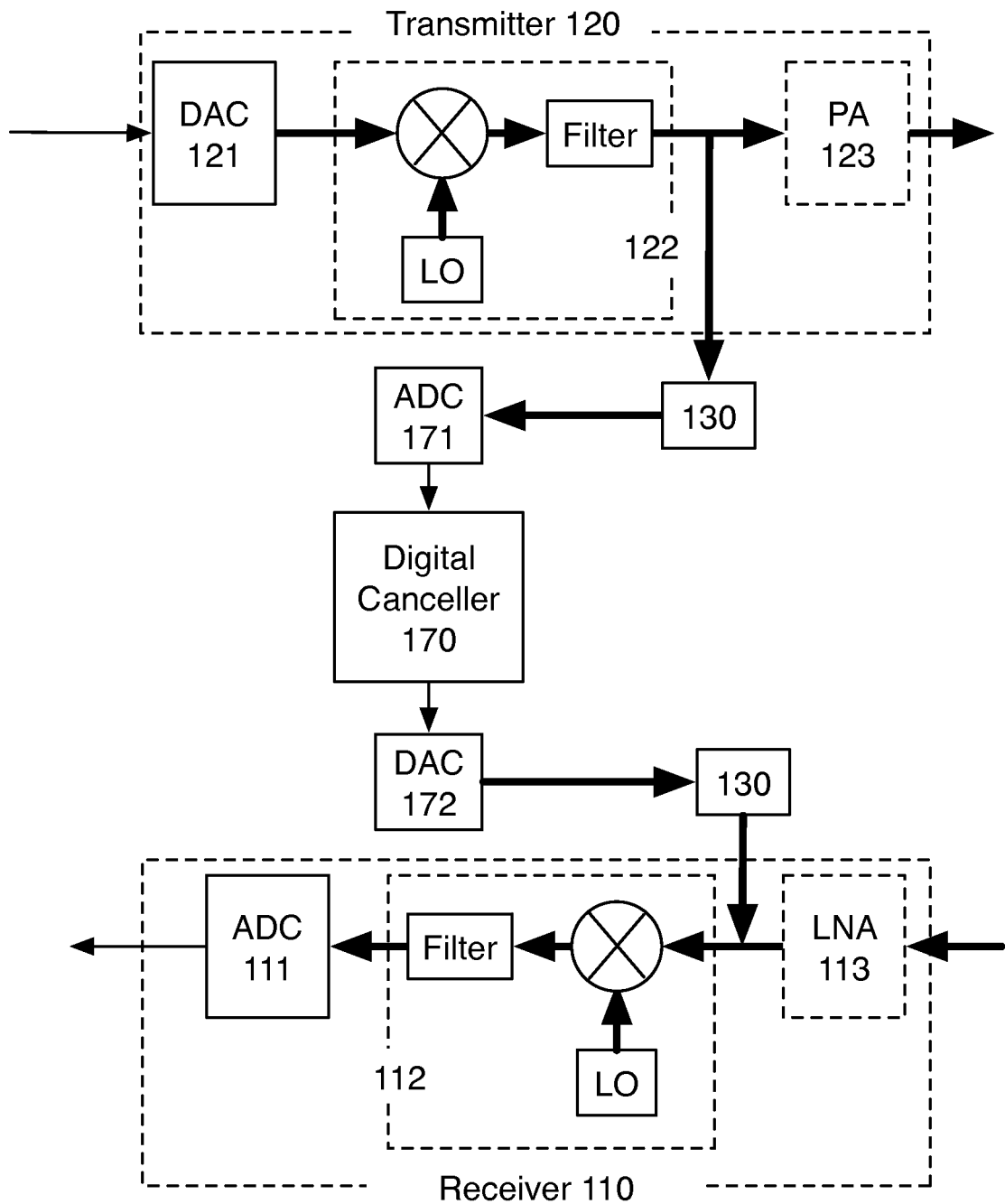
FIG. 15 is a schematic view of digital canceller coupling of a system of a preferred embodiment.

Though the cancellers 150/160/170 are preferably coupled to signal couplers 130 located after transmitter 120 outputs and before receiver 110 inputs, the cancellers 150/160/170 may additionally or alternatively be coupled to intermediate outputs and/or inputs (e.g., an output before the transmitter 120 output or an input after the receiver 110 input). For example, as shown in FIG. 15, the pre-amplifier (PA 123) output of the transmitter 120 serves as the input to the ADC 171, while the output of the DAC 172 is routed to the post-amplifier (LNA 113) input. While this example shows coupling of the digital canceller 170 to intermediate inputs and outputs any canceller (150, 160, 170) may be coupled to intermediate outputs and/or inputs in similar manner.

Figure 16:
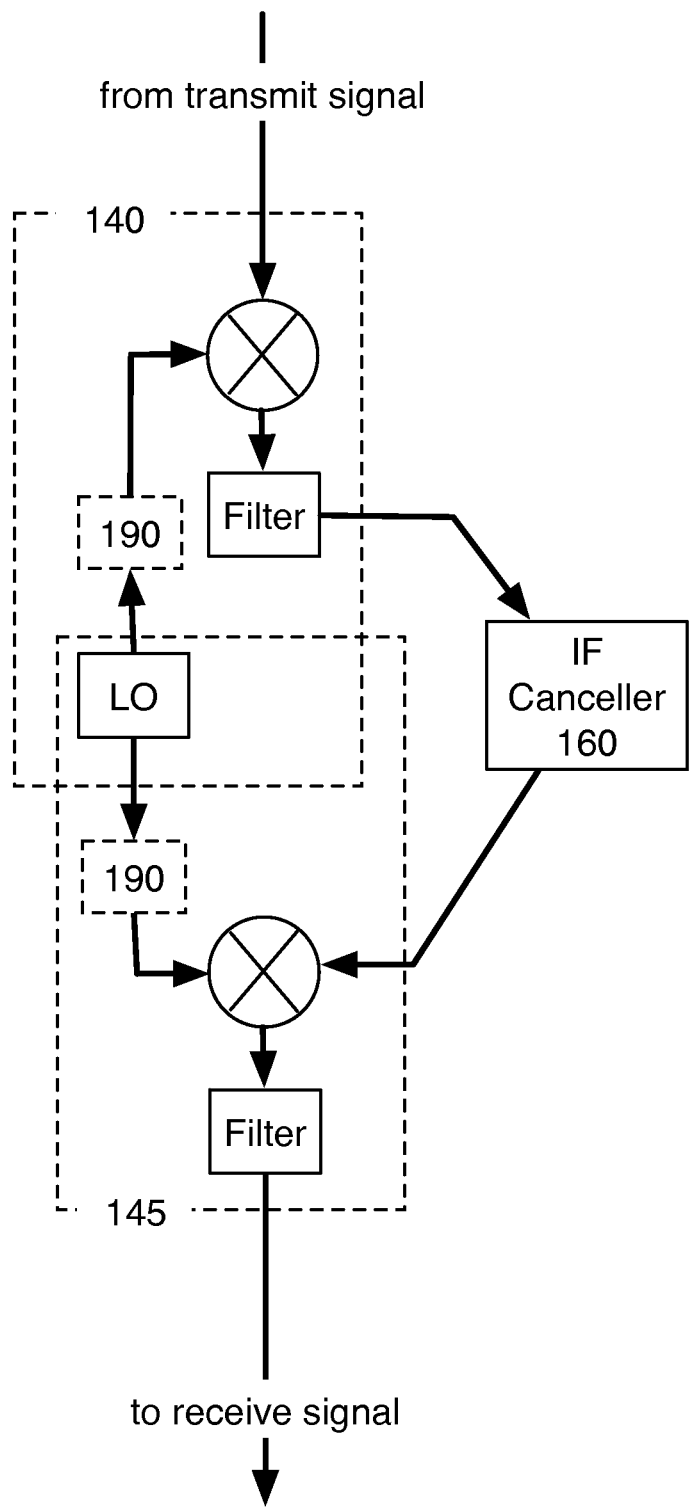
FIG. 16 is a schematic view of local oscillator sharing.

While not explicitly shown in previous FIGUREs, local oscillators (e.g., those of upconverters 122/145, downconverters 112/140, ADCs 171, and/or DACs 172) may be shared between components of the system 100. For example, the downconverter 140 and upconverter 145 may share a local oscillator as shown in FIG. 16. As another example, the downconverter 112 and downconverter 140 may share a local oscillator. This can serve to reduce phase noise errors. Local oscillators may be shared between any components of the system 100.

Figure 17:
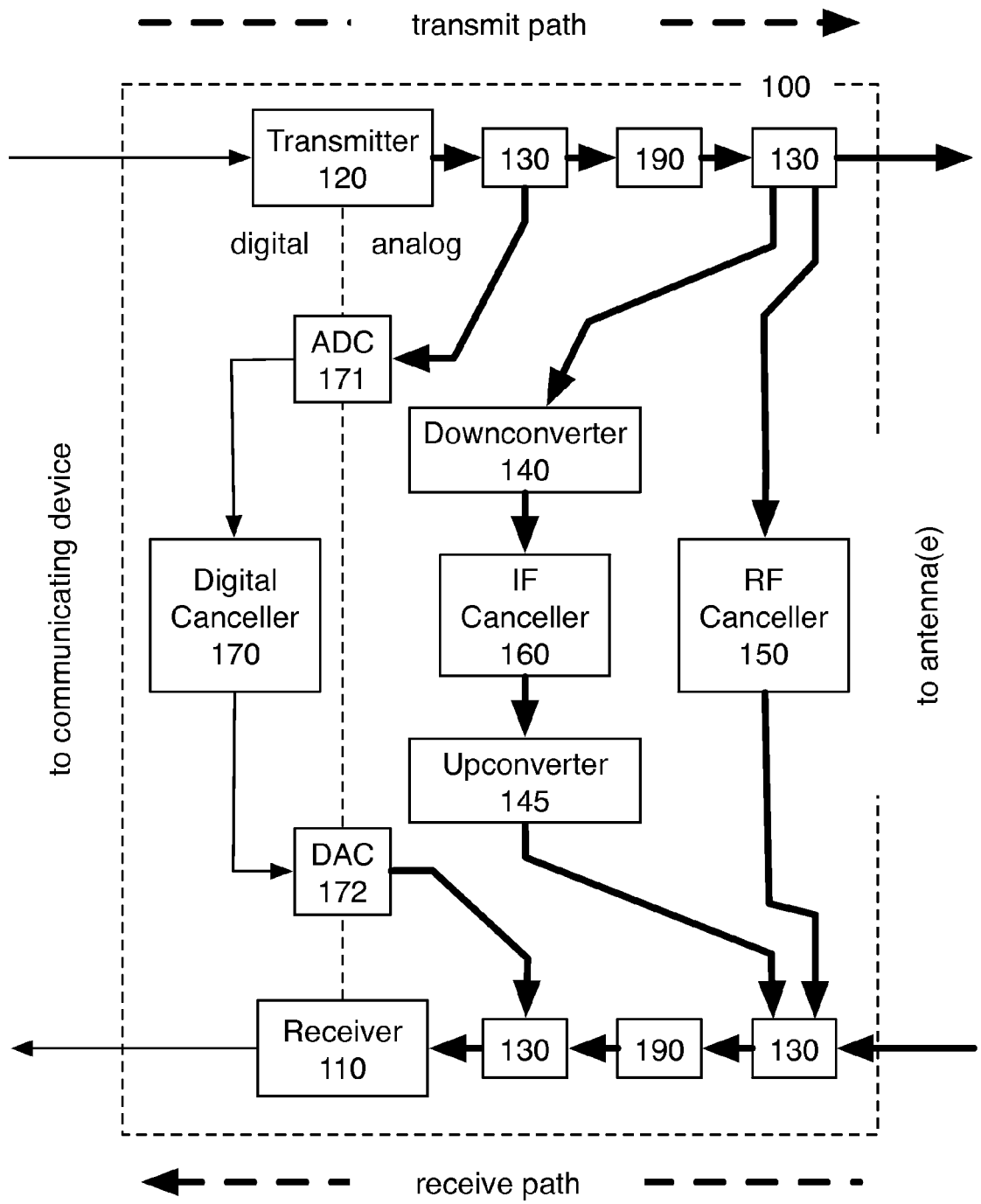
FIG. 17 is a schematic view of a system of a preferred embodiment.

Also not explicitly shown in previous figures, delayers 190 may additionally be coupled to the system 100 in a variety of ways. For example, delayers 190 may be inserted between signal couplers 130 coupled to digital canceller 170 and IF/RF canceller 160/150 inputs respectively, as shown in FIG. 17. Delayers 190 may also be inserted between signal couplers 130 coupled to digital canceller 170 and IF/RF canceller 160/150 outputs respectively, also as shown in FIG. 17. Delayers 190 may be located between any components of the system 100 (including subcomponents). For example, a delayer 190 may be placed between a local oscillator and a mixer, as shown in FIG. 16. In this case, the delayer 190 can be used to achieve better phase noise cancellation.

3. Method for Hybrid Self-Interference Cancellation

Figure 18:
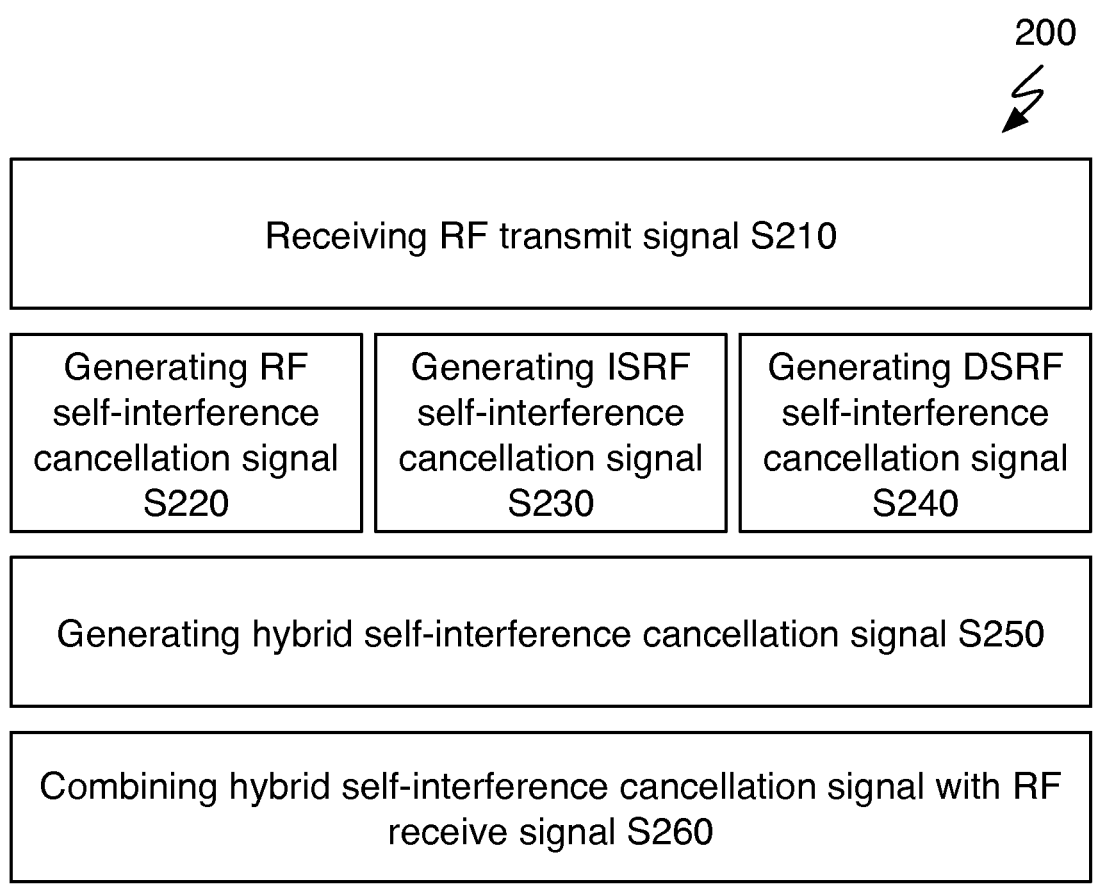
FIG. 18 is a chart view of a method of a preferred embodiment.

As shown in FIG. 18, a method 200 for hybrid self-interference cancellation includes receiving a radio-frequency (RF) transmit signal S210, generating an RF self-interference cancellation signal S220, generating an IF-sourced (IS) RF self-interference cancellation signal S230, generating a digitally-sourced (DS) RF self-interference cancellation signal S240, generating a hybrid self-interference cancellation signal S250, and combining the hybrid self-interference cancellation signal with an RF receive signal S260.

The method 200 functions to increase the performance of full-duplex transceivers (or other applicable systems) by performing hybrid self-interference cancellation. The method 200 preferably performs hybrid self-interference cancellation by performing RF, IF, and digital self-interference cancellation based on a single sampled analog transmit signal, but may additionally or alternatively perform hybrid self-interference cancellation by performing RF, IF, and digital self-interference cancellation based on any number of sampled analog and/or digital transmit signals.

The method 200 preferably performs RF, IF, and digital self-interference cancellation simultaneously and in parallel, but may additionally or alternatively perform RF, IF, and/or digital self-interference cancellation at any suitable times and in any order.

The method 200 is preferably implemented by the system 100, but may additionally or alternatively be implemented by any suitable system for hybrid self-interference cancellation.

S210 includes receiving a radio-frequency (RF) transmit signal. S210 functions to provide an analog RF signal intended for transmission by a full-duplex wireless communications system so that the signal may be used to remove self-interference at the full-duplex wireless communications system receiver. RF transmit signals received in S210 preferably include RF signals originating from an electronic device, destined for an antenna or other communication output of a full-duplex radio (or other full-duplex wireless communications system). RF transmit signals received in S210 may additionally or alternatively include RF transmit signals from any other suitable source.

S210 preferably comprises receiving the RF transmit signal by splitting an RF signal somewhere in the signal path between the RF transmitter and the antenna(e) (or other signal output) and passing the RF transmit signal to an frequency downconverter, but may additionally or alternatively receive the RF transmit signal using any other suitable method.

Step S220 includes generating an RF self-interference cancellation signal. S220 functions to produce an RF self-interference cancellation signal from the RF transmit signal, which can be combined with the RF receive signal to reduce self-interference present in the RF receive signal. Generating the RF self-interference cancellation signal S220 preferably occurs in a single RF frequency band, but may additionally or alternatively occur in multiple distinct RF frequency bands.

S220 preferably includes transforming an RF transmit signal into an RF self-interference cancellation signal by combining a set of filtered, scaled, and/or delayed versions of the RF transmit signal, but may additionally or alternatively include transforming RF transmit signals to RF self-interference cancellation signals in any suitable manner. The transformed signal (the RF self-interference cancellation signal) preferably represents at least a part of the self-interference component received at the RF receiver of a full-duplex radio.

The transformation performed in S220 is preferably adaptable to changing self-interference parameters in addition to changes in the RF transmit signal; for example, RF transceiver temperature, ambient temperature, antenna configuration, humidity, and RF transmitter power.

Figure 19:
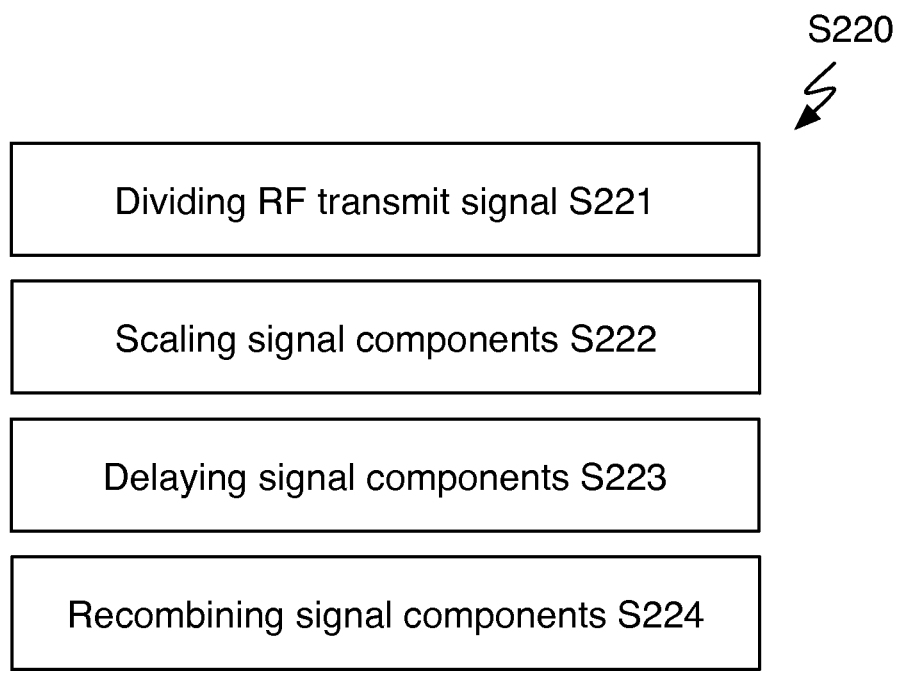
FIG. 19 is a chart view of RF self-interference cancellation signal generation of a method of a preferred embodiment.

In one implementation of a preferred embodiment, S220 includes dividing the RF transmit signal into signal components by frequency sub-band S221, scaling signal components S222, delaying signal components S223, and recombining signal components S224, as shown in FIG. 19. This implementation separates the RF transmit signal into frequency sub-bands; enabling the generation of effective self-interference signal even when self-interference is highly variable with frequency; for instance, in situations where the full-duplex radio has an antenna configuration not optimized for its RF frequency, where the full-duplex radio is placed in a very strong multipath environment, and/or where the RF receiver exhibits a substantially frequency-dependent response to RF signal input.

S221 includes dividing the RF transmit signal into signal components by frequency sub-band. Frequency sub-bands may overlap in frequency; there may additionally or alternatively be multiple signal components corresponding to the same frequency sub-band. In some cases, frequency sub-bands may encompass the entire RF passband.

S221 preferably includes splitting the RF transmit signal into multiple RF transmit signal paths and then filtering each signal path. The multiple RF transmit signal paths preferably have substantially the same waveform as the input RF transmit signal and equal power; S221 may additionally or alternatively include splitting the RF transmit signal into multiple RF transmit signals having different power levels and/or containing a different waveform than the input RF transmit signal. S221 preferably filters each signal path to isolate RF transmit signal components contained within a frequency band (typically, but not always, a sub-band of the RF transmit signal band) so that the component of self-interference resulting from the part of the RF transmit signal in that frequency band may be generated independently of the components of self-interference resulting from other parts of the RF transmit signal. As previously discussed, isolating RF transmit signal components by frequency sub-band allows for transformation to be performed on each signal component individually, increasing self-interference cancellation performance in situations where self-interference is substantially frequency dependent. Splitting parameters are preferably controlled dynamically, but may additionally or alternatively be static.

S222 includes scaling signal components. S222 functions to effectively multiply the RF transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Thus, S222 also functions to provide weighting for the combination of RF self-interference components during S224 (e.g., a signal with scale factor 2 is weighted twice as heavily as one with a scale factor of 1). Scaling may include attenuating, amplifying, and/or inverting phase. Scaling parameters are preferably controlled dynamically, but may additionally or alternatively be static.

S223 includes delaying signal components. S223 functions to delay RF transmit signal components, preferably to match corresponding delays in received self-interference. The delay introduced by S223 in each signal component is preferably variable (and controlled dynamically) but S223 may additionally or alternatively include introducing set delays.

After transformation by S222 and/or S223, RF transmit signal components are transformed into RF self-interference cancellation signal components, which may be combined to form an RF self-interference cancellation signal.

S224 includes recombining signal components. S224 functions to combine the RF self-interference signal components into an RF self-interference cancellation signal; the RF self-interference cancellation signal may then be combined with an RF receive signal to remove self-interference. S224 preferably includes recombining signal components without performing any additional weighting (beyond that performed by S222) but may additionally or alternatively include any suitable post-processing to prepare the RF self-interference signal for combination with the RF receive signal; for example, amplifying, delaying, or inverting the RF self-interference cancellation signal.

Step S230, generating an ISRF self-interference cancellation signal, is preferably substantially similar to Step S220 except that Step S230 includes additional upconversion and downconversion steps, and self-interference transformation is performed on IF signals instead of RF signals. Step S230 preferably includes downconverting the RF transmit signal to an intermediate frequency, generating an IF self-interference cancellation signal, and upconverting the IF self-interference cancellation signal.

Figure 20:
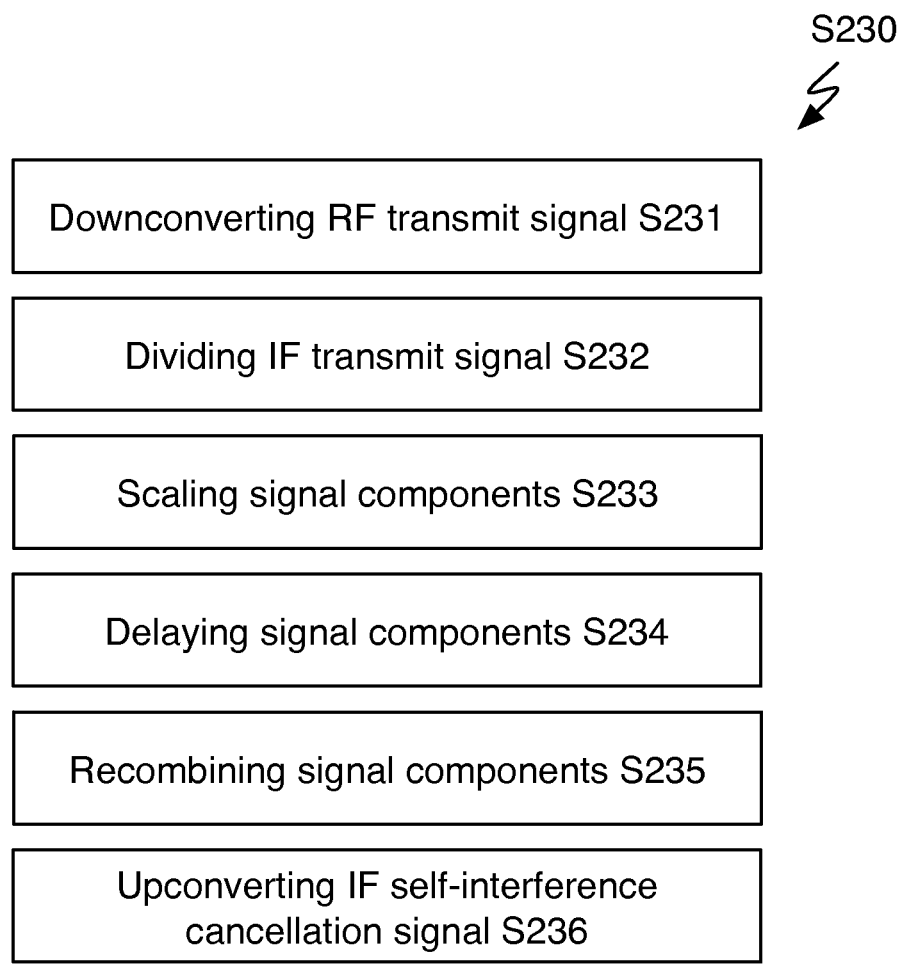
FIG. 20 is a chart view of ISRF self-interference cancellation signal generation of a method of a preferred embodiment.

In one implementation of a preferred embodiment, S230 includes downconverting the RF transmit signal to an IF transmit signal S231, dividing the IF transmit signal into signal components by frequency sub-band S232, scaling signal components S233, delaying signal components S234, recombining signal components S235, and upconverting the IF self-interference cancellation signal to an RF self-interference cancellation signal S236, as shown in FIG. 20. This implementation separates the IF transmit signal into frequency sub-bands; enabling the generation of effective self-interference signal even when self-interference is highly variable with frequency; for instance, in situations where the full-duplex radio has an antenna configuration not optimized for its RF frequency, where the full-duplex radio is placed in a very strong multipath environment, and/or where the RF receiver exhibits a substantially frequency-dependent response to RF signal input.

Step S231 includes downconverting the RF transmit signal to an intermediate frequency (IF) transmit signal. S231 functions to downconvert the carrier frequency of the RF transmit signal (received in S210) to an intermediate frequency (or, in some cases, baseband (IF=0 Hz)) preparing it for transformation to an IF self-interference signal. S231 preferably includes downconverting the RF transmit signal using heterodyning methods, but may additionally or alternatively use any suitable downconversion methods.

S231 may enable RF signals of different carrier frequency to be downconverted to the same IF carrier frequency. Enabling different RF carrier frequencies to be converted to the same IF carrier frequency allows IF analog self-interference generation to occur at a single (IF) frequency independent of RF frequencies.

S231 may additionally or alternatively include any other suitable processing to prepare the RF transmit signal for transformation (e.g., scaling, shifting, and/or otherwise modifying the RF transmit signal).

Steps S232, S233, S234, and S235 are preferably substantially similar to Steps S221, S222, S223, and S234 respectively, except that transformation is performed on IF signals instead of RF signals.

Step S236 includes upconverting the IF self-interference signal to an RF self-interference signal. S236 functions to upconvert the carrier frequency of the IF self-interference cancellation signal (generated in S235) to the RF carrier frequency of the RF receive signal (or any other suitable RF frequency) preparing it for combination with the RF receive signal. S236 preferably includes upconverting the IF self-interference signal using heterodyning methods, but may additionally or alternatively use any suitable upconversion methods.

S236 may additionally or alternatively include any other suitable processing to prepare the IF self-interference cancellation for hybrid self-interference signal generation in Step S250 (e.g., scaling, shifting, and/or otherwise modifying the IF self-interference cancellation signal).

Step S240 includes generating a DSRF self-interference cancellation signal. S240 functions to produce a digital self-interference cancellation signal from a digitized RF transmit signal, which can then be combined (either with the RF receive signal or the digital receive signal) to reduce self-interference.

Figure 21:
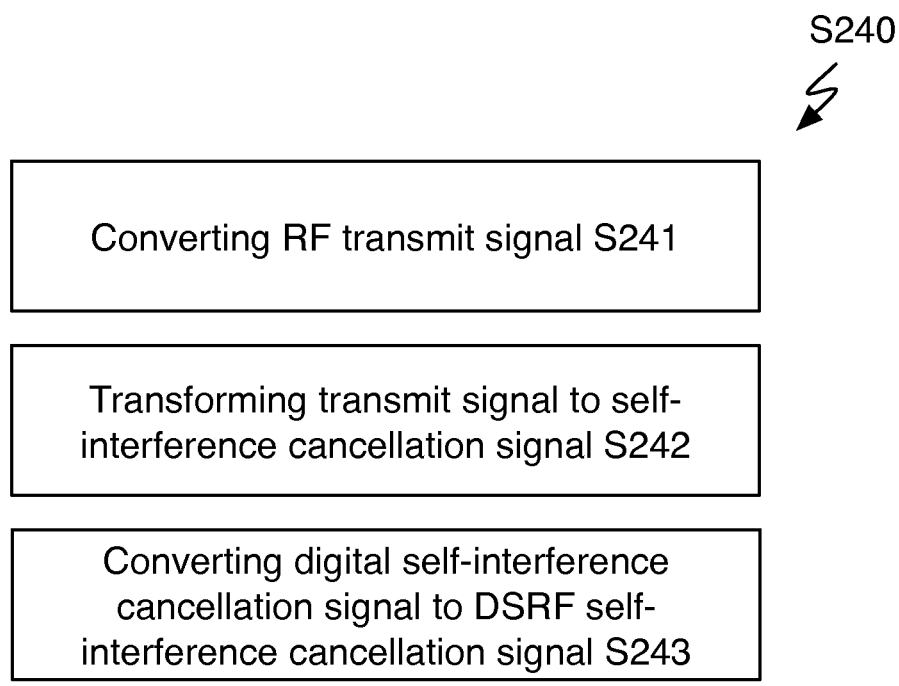
FIG. 21 is a chart view of DSRF self-interference cancellation signal generation of a method of a preferred embodiment.

Step S240 preferably includes converting the RF transmit signal to a digitized RF transmit signal S241, transforming the digitized RF transmit signal into a digital self-interference signal S242, and converting the digital self-interference cancellation signal to a digitally-sourced RF self-interference cancellation signal S243, as shown in FIG. 21. Steps S241 and S243 are optional—in particular, if Step S241 is not performed, Step S242 is preferably performed on a digital transmit signal (e.g., digital signal before conversion by a transmitter) instead of on a digitized RF transmit signal.

Step S241 includes converting the RF transmit signal to a digitized RF transmit signal. S241 functions to perform analog-to-digital conversion on the RF transmit signal. S241 is preferably performed on the transmit signal after the power amplifier, but may additionally or alternatively be performed on the RF transmit signal at any coupling location or any point in time. In some cases, Step S241 may be performed on related signals (e.g., an IF transmit signal). S241 may additionally or alternatively include any other suitable processing to prepare the RF transmit signal for analog-to-digital conversion (e.g., scaling, shifting, and/or otherwise modifying the RF transmit signal).

Step S242 includes transforming the digitized RF transmit signal into a digital self-interference cancellation signal. S242 functions to produce a digital self-interference signal from the digitized RF transmit signal (or from any digital transmit signal). S242 preferably includes transforming the digital transmit signal to a digital self-interference signal based on a digital transform configuration. The digital transform configuration preferably includes settings that dictate how the digital transmit signal is transformed to a digital self-interference cancellation signal (e.g., coefficients of a generalized memory polynomial used to transform the transmit signal to a self-interference signal).

Step S243 includes converting the digital self-interference cancellation signal to a digitally-sourced RF self-interference cancellation signal. S241 functions to perform digital-to-analog conversion on the digital self-interference cancellation signal. S243 preferably includes converting the digital self-interference cancellation signal to a DSRF self-interference cancellation signal in a two-step process; first converting the digital self-interference cancellation signal to a baseband self-interference cancellation signal and then converting the baseband self-interference cancellation signal to an RF self-interference cancellation signal. Additionally or alternatively, S243 may include converting the digital self-interference cancellation signal to a DSRF self-interference cancellation signal using any other suitable process. S243 may alternatively include converting the digital self-interference cancellation signal to a digitally-sourced intermediate frequency (DSIF) self-interference cancellation signal. S243 may additionally or alternatively include any other suitable processing to prepare the digital self-interference cancellation signal for digital-to-analog conversion (e.g., scaling, shifting, and/or otherwise modifying the digital self-interference cancellation signal).

Step S250 includes generating a hybrid self-interference cancellation signal. Step S250 functions to generate a self-interference cancellation signal from one or more of the RF, ISRF, and DSRF self-interference cancellation signals. Step S250 preferably includes combining all three self-interference cancellation signals with the RF receive signal at a signal coupler, but may additionally or alternatively include combining self-interference cancellation signals in any order and in any location. For example, Step S250 may include combining RF and ISRF signals at a first signal coupler, but DSRF signals at a second signal coupler (as shown in FIG. 17). Step S250 may additionally include any suitable signal processing (e.g., weighting signals, phase-shift signals, scaling signals, etc.).

Step S260 includes combining the hybrid self-interference cancellation signal with an RF receive signal. S260 functions to couple the hybrid self-interference cancellation signal generated by the method 200 to the RF receive signal of the full-duplex radio. S260 preferably includes coupling the majority of input power to the RF receiver signal; this coupling preferably results in the RF receiver receiving a sum of the self-interference signal (generated in S250) and the RF receive signal (received at the antenna(e)). Additionally or alternatively, S260 may include coupling or routing power in any suitable manner.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for hybrid self-interference cancellation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for hybrid self-interference cancellation comprising:
    a transmit coupler, communicatively coupled to an RF transmit signal of a wireless communication system, that samples the RF transmit signal to create a sampled RF transmit signal having a first RF carrier frequency;
    a frequency downconverter that converts the sampled RF transmit signal to an IF transmit signal having an IF carrier frequency, wherein the IF carrier frequency is less than the first RF carrier frequency;
    an IF self-interference canceller that transforms the IF transmit signal to an IF self-interference cancellation signal;
    a frequency upconverter that converts the IF self-interference cancellation signal to an IF-sourced RF self-interference signal;
    an RF self-interference canceller that transforms the sampled RF transmit signal to an RF self-interference cancellation signal;
    a receive coupler, communicatively coupled to an RF receive signal of the wireless communication system, that combines the RF self-interference cancellation signal and the IF-sourced RF self-interference cancellation signal with the RF receive signal;
    a digital self-interference canceller that transforms a digital transmit signal of the wireless communication system to a digital self-interference cancellation signal; and
    a delayer located in a signal path between the RF and IF self-interference cancellers and the digital self-interference canceller, wherein the delayer delays the RF self-interference cancellation signal and the IF-sourced RF self-interference cancellation signal.

2. The system of claim 1, wherein the RF self-interference canceller comprises a signal divider, a set of scalers and delayers, and a signal combiner.

3. The system of claim 2, wherein the IF self-interference canceller comprises a signal divider, a set of tunable filters, a set of scalers and delayers, and a signal combiner.

4. The system of claim 3, wherein the frequency upconverter and the frequency downconverter share a local oscillator.

5. The system of claim 1, further comprising an analog-to-digital converter; wherein the analog-to-digital converter converts the sampled RF transmit signal to a digitized RF transmit signal; wherein the digital self-interference canceller transforms a combination of a digital transmit signal and the digitized RF transmit signal to a digital self-interference cancellation signal.

6. The system of claim 1, further comprising an analog-to-digital converter; wherein the analog-to-digital converter converts the sampled RF transmit signal to a digitized RF transmit signal; wherein the digital self-interference canceller transforms the digitized RF transmit signal to a digital self-interference cancellation signal.

7. The system of claim 6, further comprising a digital-to-analog converter; wherein the digital-to-analog converter converts the digital self-interference cancellation signal to a digitally-sourced RF self-interference cancellation signal; wherein the receive coupler combines the RF self-interference cancellation signal, the IF-sourced RF self-interference cancellation signal, and the digitally-sourced RF self-interference cancellation signal with the RF receive signal.

8. The system of claim 1, further comprising an analog-to-digital converter; wherein the analog-to-digital converter converts the IF transmit signal to a digitized IF transmit signal; wherein the digital self-interference canceller transforms the digitized IF transmit signal to a digital self-interference cancellation signal.

9. The system of claim 8, further comprising a digital-to-analog converter; wherein the digital-to-analog converter converts the digital self-interference cancellation signal to a digitally-sourced RF self-interference cancellation signal; wherein the receive coupler combines the RF self-interference cancellation signal, the IF-sourced RF self-interference cancellation signal, and the digitally-sourced RF self-interference cancellation signal with the RF receive signal.

10. The system of claim 8, further comprising a digital-to-analog converter; wherein the digital-to-analog converter converts the digital self-interference cancellation signal to a digitally-sourced IF self-interference cancellation signal; wherein the digitally-sourced IF self-interference cancellation signal and the IF self-interference cancellation signal are combined to form an IF hybrid self-interference cancellation signal; wherein the upconverter converts the IF hybrid self-interference cancellation signal to an RF hybrid self-interference cancellation signal; wherein the receive coupler combines the RF self-interference cancellation signal, and the RF hybrid self-interference cancellation signal with the RF receive signal.

11. A system for hybrid self-interference cancellation comprising:
  a transmit coupler, communicatively coupled to an RF transmit signal of a wireless communication system, that samples the RF transmit signal to create a sampled RF transmit signal having a first RF carrier frequency;
  a frequency downconverter that converts the sampled RF transmit signal to an IF transmit signal having an IF carrier frequency, wherein the IF carrier frequency is less than the first RF carrier frequency;
  an IF self-interference canceller that transforms the IF transmit signal to an IF self-interference cancellation signal;
  a frequency upconverter that converts the IF self-interference cancellation signal to an IF-sourced RF self-interference signal;
  an RF self-interference canceller that transforms the sampled RF transmit signal to an RF self-interference cancellation signal;
  a receive coupler, communicatively coupled to an RF receive signal of the wireless communication system, that combines the RF self-interference cancellation signal and the IF-sourced RF self-interference cancellation signal with the RF receive signal; and
  a digital self-interference canceller;
  an analog-to-digital converter; wherein the analog-to-digital converter converts the IF transmit signal to a digitized IF transmit signal; wherein the digital self-interference canceller transforms the digitized IF transmit signal to a digital self-interference cancellation signal; and
  a digital-to-analog converter; wherein the digital-to-analog converter converts the digital self-interference cancellation signal to a digitally-sourced IF self-interference cancellation signal; wherein the digitally-sourced IF self-interference cancellation signal and the IF self-interference cancellation signal are combined to form an IF hybrid self-interference cancellation signal; wherein the upconverter converts the IF hybrid self-interference cancellation signal to an RF hybrid self-interference cancellation signal; wherein the receive coupler combines the RF self-interference cancellation signal and the RF hybrid self-interference cancellation signal with the RF receive signal.

12. The system of claim 11, wherein the RF self-interference canceller comprises a signal divider, a set of scalers and delayers, and a signal combiner.

13. The system of claim 12, wherein the IF self-interference canceller comprises a signal divider, a set of tunable filters, a set of scalers and delayers, and a signal combiner.

14. The system of claim 13, wherein the frequency upconverter and the frequency downconverter share a local oscillator.

15. The system of claim 11, further comprising a delayer located in a signal path between the RF and IF self-interference cancellers and the digital self-interference canceller, wherein the delayer delays the RF self-interference cancellation signal and the IF-sourced RF self-interference cancellation signal.

16. The system of claim 15, wherein the RF self-interference canceller comprises a signal divider, a set of scalers and delayers, and a signal combiner.

17. The system of claim 16, wherein the IF self-interference canceller comprises a signal divider, a set of tunable filters, a set of scalers and delayers, and a signal combiner.

18. The system of claim 17, wherein the frequency upconverter and the frequency downconverter share a local oscillator.

* * * * *